US010789701B2

(12) United States Patent
Weiss et al.

(10) Patent No.: US 10,789,701 B2
(45) Date of Patent: Sep. 29, 2020

(54) METHOD FOR PREDICTING DEFECTS IN ASSEMBLY UNITS

(71) Applicant: Instrumental, Inc., Los Altos, CA (US)

(72) Inventors: Samuel Bruce Weiss, Palo Alto, CA (US); Anna-Katrina Shedletsky, Palo Alto, CA (US); Simon Kozlov, Burlingame, CA (US); Ana Ulin, Palo Alto, CA (US); Mikhail Okunev, Palo Alto, CA (US); Isaac Sukin, San Francisco, CA (US)

(73) Assignee: Instrumental, Inc., Los Altos, CA (US)

( * ) Notice: Subject to any disclaimer, the term of this patent is extended or adjusted under 35 U.S.C. 154(b) by 266 days.

(21) Appl. No.: 15/953,206

(22) Filed: Apr. 13, 2018

(65) Prior Publication Data
US 2018/0300865 A1    Oct. 18, 2018

Related U.S. Application Data

(60) Provisional application No. 62/485,209, filed on Apr. 13, 2017.

(51) Int. Cl.
| | |
|---|---|
| *G06K 9/00* | (2006.01) |
| *G06T 7/00* | (2017.01) |
| *G06T 7/10* | (2017.01) |
| *G06T 3/00* | (2006.01) |

(52) U.S. Cl.
CPC ............... *G06T 7/001* (2013.01); *G06T 7/10* (2017.01); *G06T 3/0068* (2013.01); *G06T 2200/24* (2013.01); *G06T 2207/20021* (2013.01); *G06T 2207/20081* (2013.01); *G06T 2207/20104* (2013.01)

(58) Field of Classification Search
CPC ........... H01L 22/12; G06T 2207/30148; G06T 7/0004; G06T 7/001; G01N 21/9501
USPC ....................... 382/141; 702/182, 82; 714/25
See application file for complete search history.

(56) References Cited

U.S. PATENT DOCUMENTS

| | | |
|---|---|---|
| 4,510,673 A | 4/1985 | Shils et al. |
| 6,301,515 B1 | 10/2001 | Wagner |
| 6,477,266 B1 | 11/2002 | Asar |
| 7,231,079 B2 | 6/2007 | Okuda et al. |

(Continued)

FOREIGN PATENT DOCUMENTS

CN        1043376566        2/2015

*Primary Examiner* — Charlotte M Baker
(74) *Attorney, Agent, or Firm* — Run8 Patent Group, LLC; Peter Miller

(57) ABSTRACT

One variation of a method for predicting manufacturing defects includes: accessing a set of inspection images of a set of assembly units recorded by an optical inspection station; for each inspection image in the set of inspection images, detecting a set of features in the inspection image and generating a vector representing the set of features in a multi-dimensional feature space; grouping neighboring vectors in the multi-dimensional feature space into a set of vector groups; and, in response to receipt of a first inspection result indicting a defect in a first assembly unit, in the set of assembly units, associated with a first vector in a first vector group, in the set of vector groups, labeling the first vector group with the defect and flagging a second assembly unit associated with a second vector, in the first vector group, as exhibiting characteristics of the defect.

19 Claims, 6 Drawing Sheets

(56) References Cited

U.S. PATENT DOCUMENTS

| | | | |
|---|---|---|---|
| 7,292,959 B1* | 11/2007 | Markle | G05B 19/41875 |
| | | | 702/182 |
| 9,098,891 B2* | 8/2015 | Kulkarni | G06T 7/0004 |
| 2013/0202188 A1* | 8/2013 | Urano | G06K 9/6202 |
| | | | 382/149 |
| 2015/0051860 A1* | 2/2015 | Zuo | G07C 3/14 |
| | | | 702/82 |

* cited by examiner

METHOD FOR PREDICTING DEFECTS IN ASSEMBLY UNITS

CROSS-REFERENCE TO RELATED APPLICATIONS

This Application claims the benefit of U.S. Provisional Application No. 62/485,209, filed on 13 Apr. 2017, which is incorporated in its entirety by this reference.

TECHNICAL FIELD

This invention relates generally to the field of optical inspection and more specifically to a new and useful method for predicting defects in assembly units in the field of optical inspection.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1:
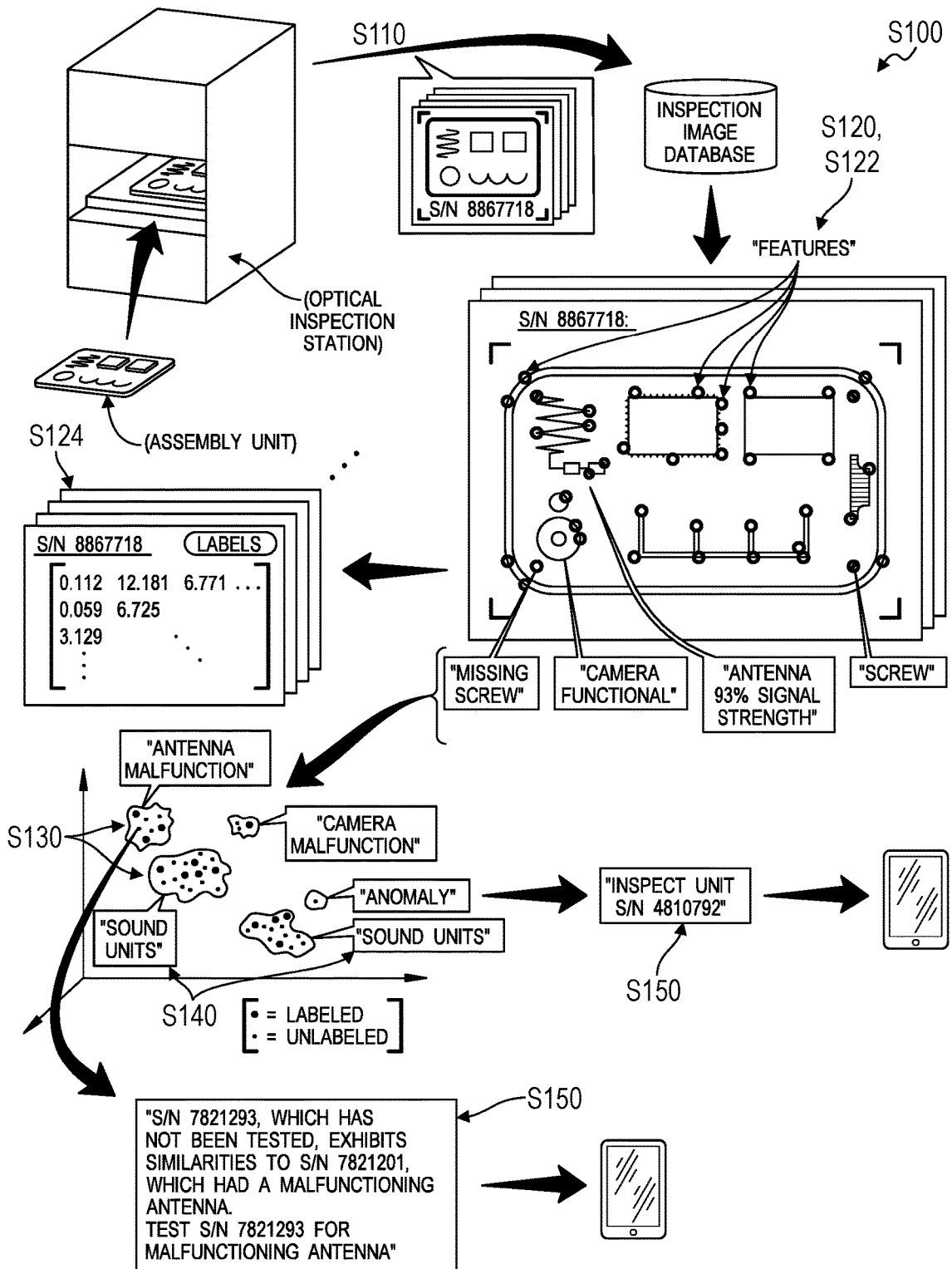
FIG. 1 is a flowchart representation of a method.
Figure 2:
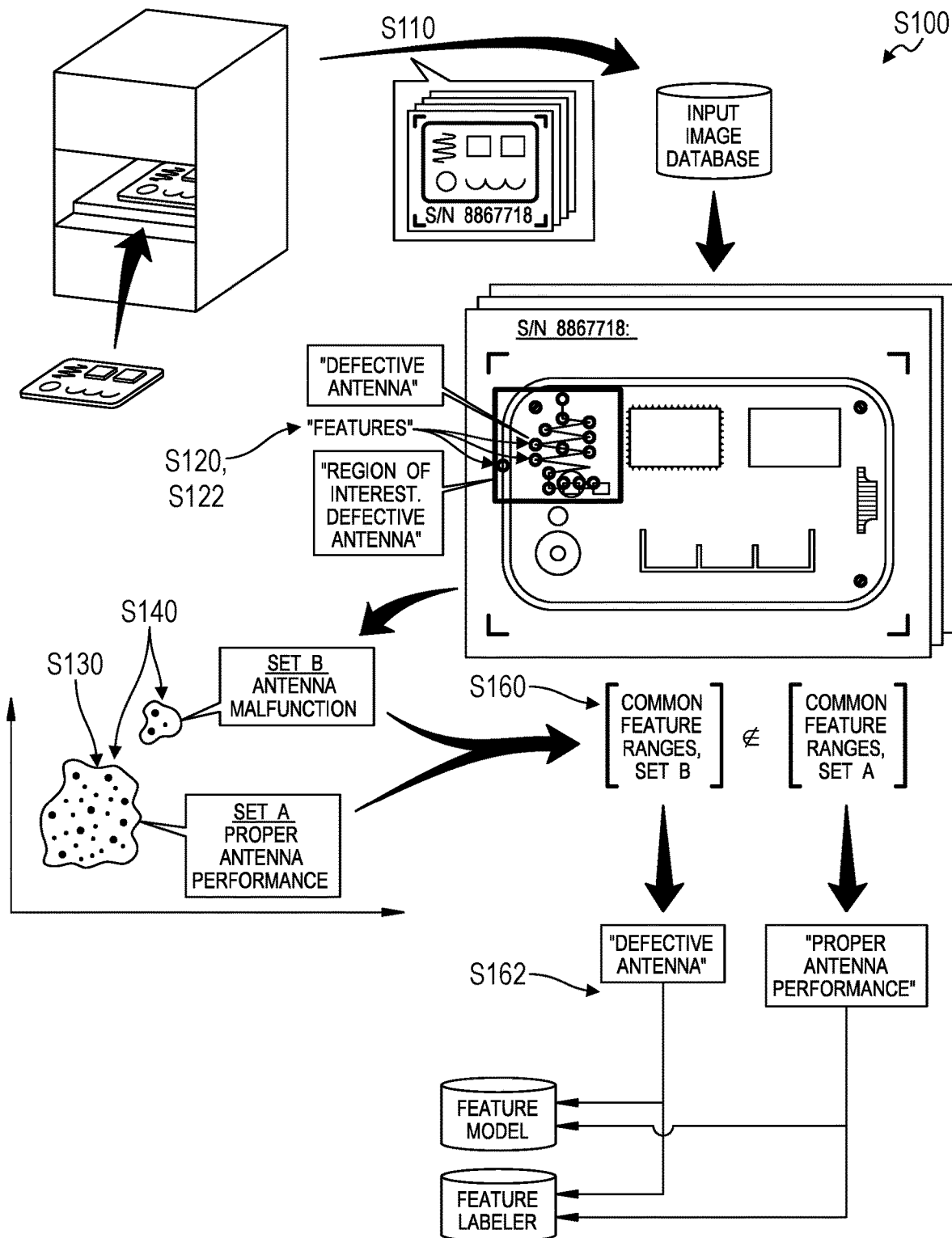
FIG. 2 is a flowchart representation of one variation of the method.

As shown in FIGS. 1 and 2, a method S100 includes: accessing a set of inspection images of a set of assembly units, of a particular assembly type, recorded by an optical inspection station during production of the set of assembly units in Block S110; for each inspection image in the set of inspection images, detecting a set of features in the inspection image in Block S120 and generating a vector, in a set of vectors, representing the set of features in a multi-dimensional feature space in Block S124; and grouping neighboring vectors, in the set of vectors, in the multi-dimensional feature space into a set of vector groups in Block S130.

1.1 Method: Intelligent Recall and Defect Propagation

Figure 5:
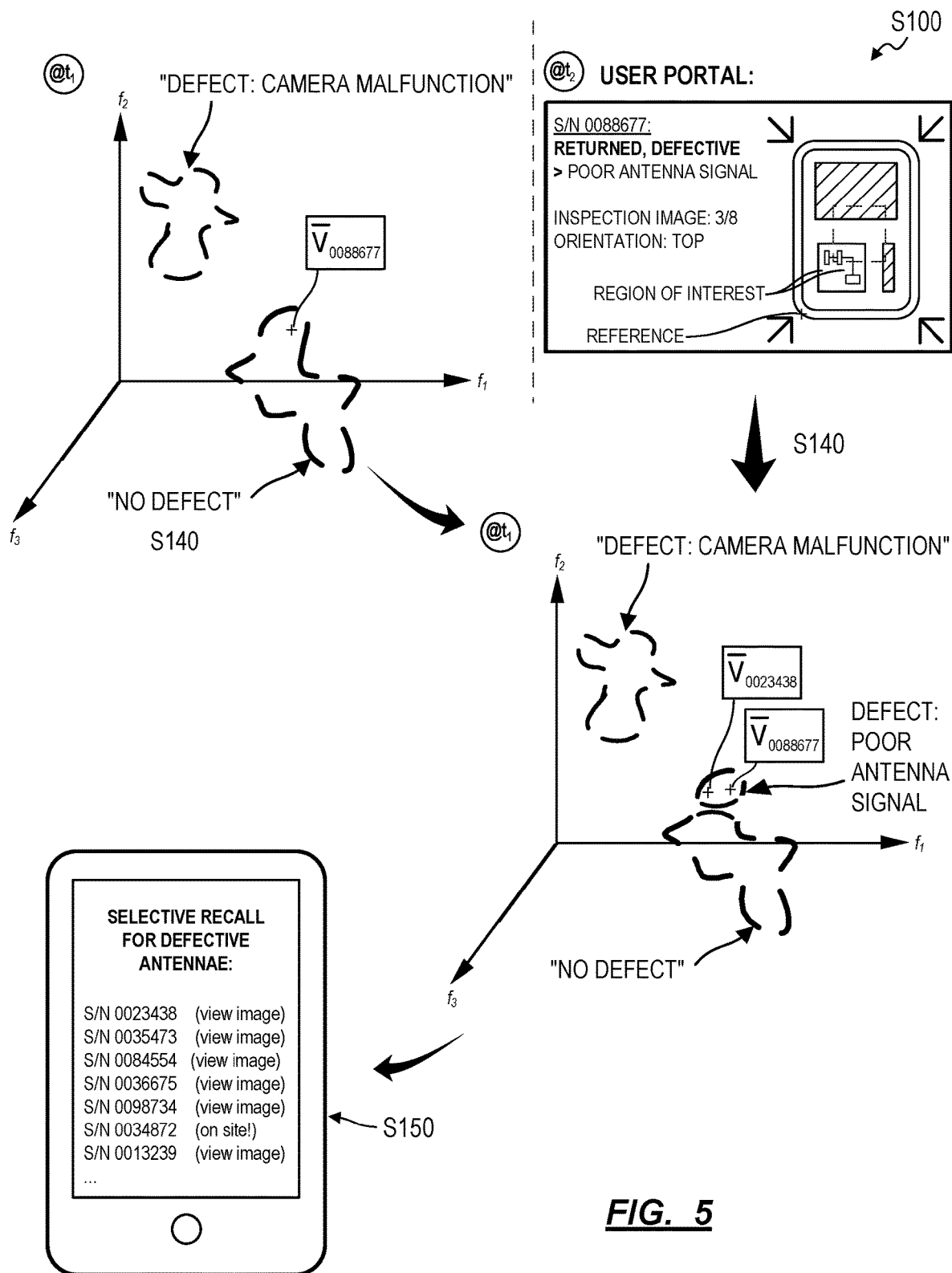
FIG. 5 is a flowchart representation of one variation of the method.

In one variation shown in FIGS. 1 and 5 in which the method S100 is implemented to propagate detection of defects in assembly units completed in the past, the method S100 also includes, in response to receipt of a first inspection result indicating a defect in a first assembly unit, in the set of assembly units, associated with a first vector in a first vector group, in the set of vector groups: labeling the first vector group with the defect in Block S140; and flagging a second assembly unit associated with a second vector, in the first vector group, as exhibiting characteristics of the defect in Block S150.

1.2 Method: Defect Source Isolation

In another variation shown in FIG. 2 in which the method S100 is implemented to predict defect modes (e.g., groups of features that indicate failure or defects in assembly units), the method S100 also includes: labeling a first vector group, in the set of vector groups, with a defect indicated in inspection results of a first subset of assembly units, in the set of assembly units, associated with vectors in the first vector group in Block S140; labeling a second vector group, in the set of vector groups, with absence of the defect based on inspection results of a second subset of assembly units, in the set of assembly units, associated with vectors in the second vector group in Block S140; identifying a model set of feature ranges represented in vectors in the first vector group and distinct from vectors in the second vector group in Block S160; and associating the model set of features with the defect in Block S162.

In this variation, the method S100 can be similarly implemented to predict groups of features that indicate absence of a defect in assembly units. In this variation, the method S100 can additionally or alternatively include: identifying a model set of features common to vectors in the second vector group and excluded from vectors in the first vector group in Block S160; and associating the model set of features with proper operation of the particular function for the particular assembly type in Block S162.

1.3 Method: Real-Time Yield Protection

Figure 6:
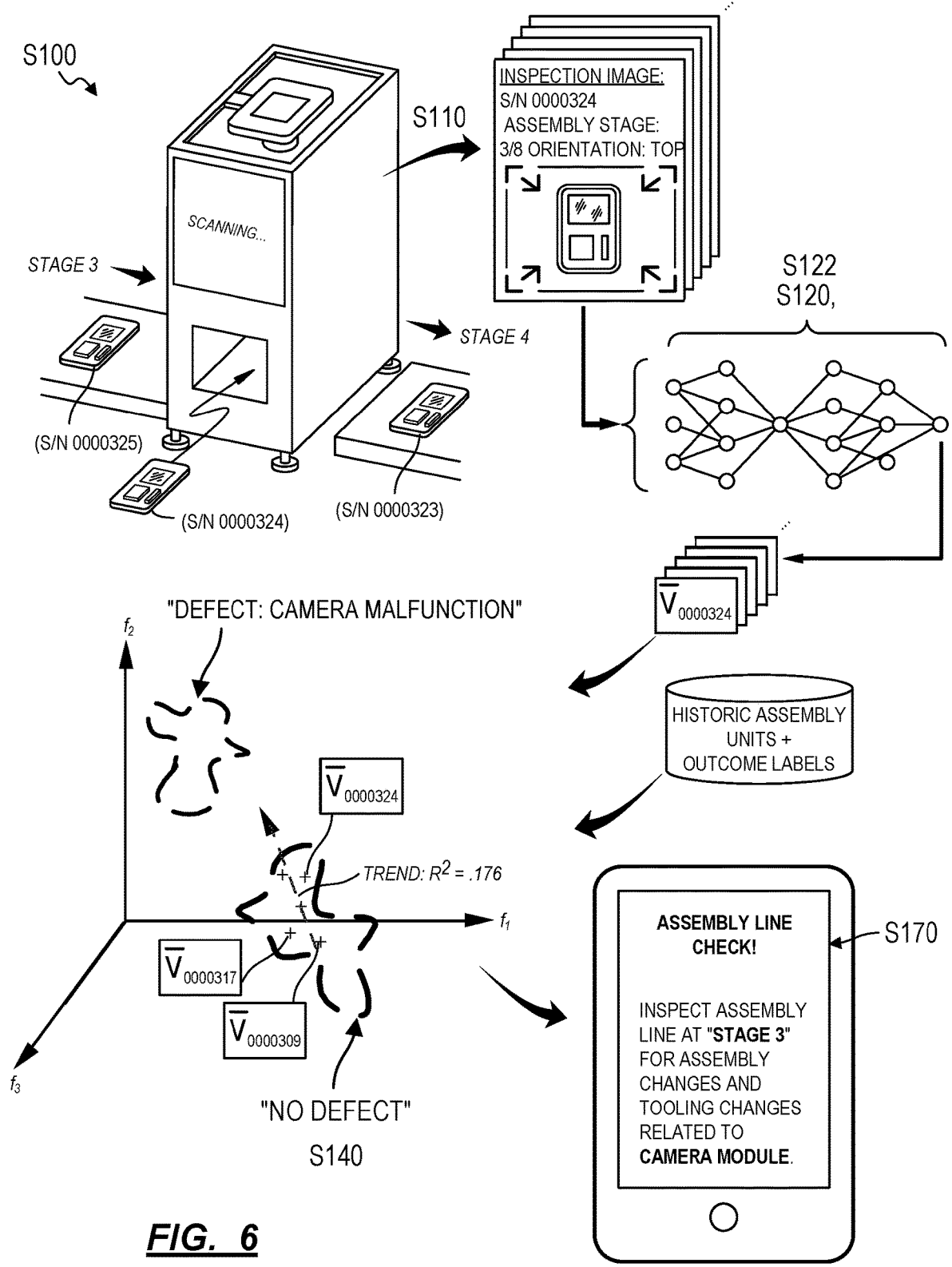
FIG. 6 is a flowchart representation of one variation of the method.

In another variation shown in FIG. 6 in which the method S100 is implemented to detect manufacturing drift toward characteristics of defective assembly units over time, the method S100 also includes: labeling a first vector group, in the first set of vector groups, with a defect based on a first inspection result indicating the defect in a first assembly unit, in the first set of assembly units, associated with a first vector in the first vector group in Block S140; accessing a second sequence of inspection images of a second set of assembly units, of the particular assembly type, recorded by the optical inspection station during production of the second set of assembly units over a second period of time succeeding the first period of time; for each inspection image in the second sequence of inspection images, detecting a set of features in the inspection image and generating a vector, in a second set of vectors, representing the set of features in the multi-dimensional feature space; and, in response to the second set of vectors trending toward the first vector group over the second period of time, generating a prompt to inspect production preceding the optical inspection station in Block S170.

In a similar variation in which the method S100 is implemented to detect manufacturing drift away from characteristics of functional assembly units over time, the method S100 also includes: labeling a first vector group, in the first set of vector groups, as functional based on a first inspection result indicating complete functionality of a first assembly unit, in the first set of assembly units, associated with a first vector in the first vector group in Block S140; accessing a second sequence of inspection images of a second set of assembly units, of the particular assembly type, recorded by the optical inspection station during production of the second set of assembly units over a second period of time succeeding the first period of time; for each inspection image in the second sequence of inspection images, detecting a set of features in the inspection image and generating a vector, in a second set of vectors, representing the set of features in the multi-dimensional feature space; and, in response to the second set of vectors trending outwardly from the first vector group over the second period of time, generating a prompt to inspect production preceding the optical inspection station.

1.4 Method: Real-Time Anomaly Detection

Figure 3:
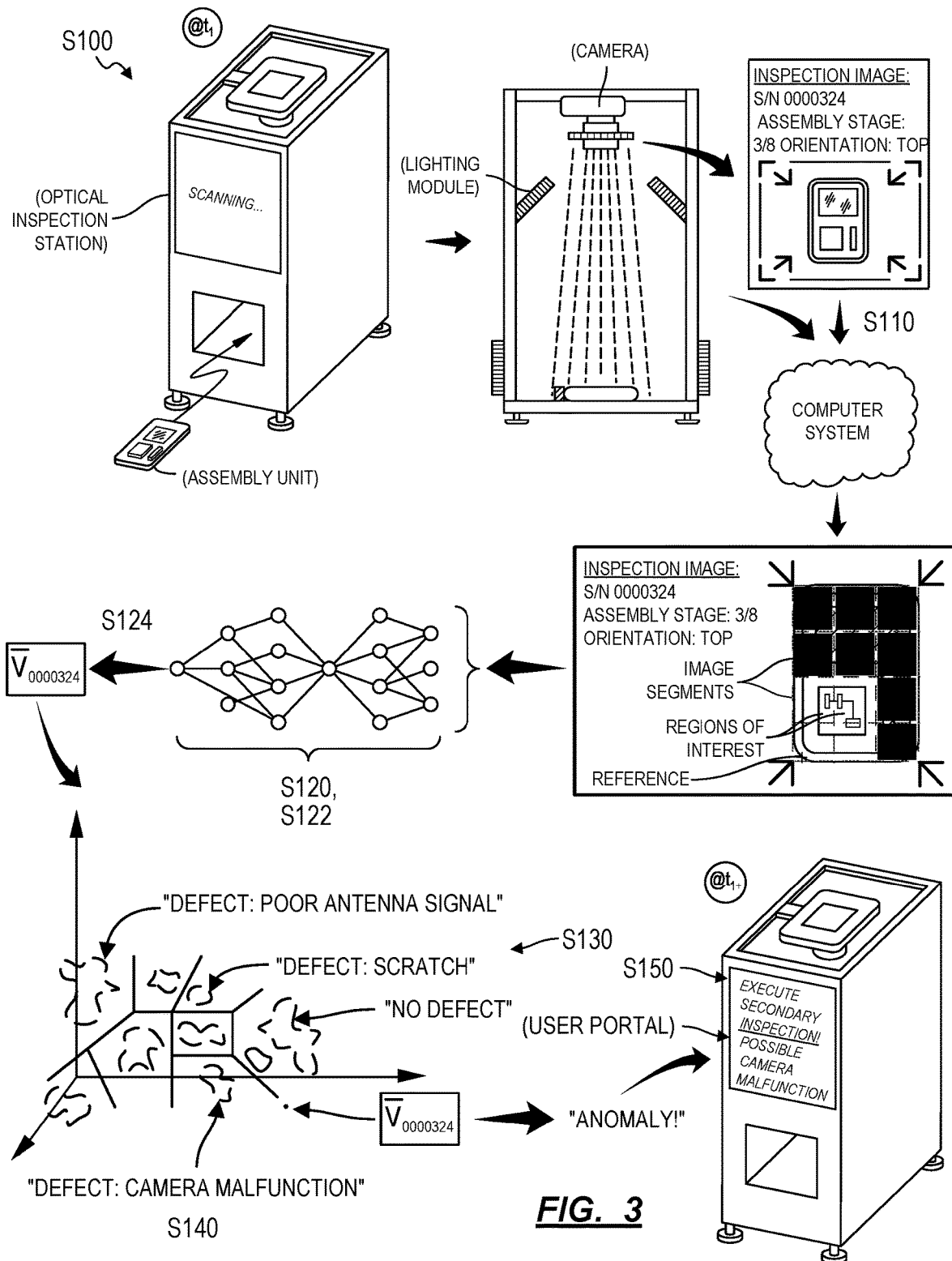
FIG. 3 is a flowchart representation of one variation of the method.

In yet another variation shown in FIG. 3 in which the method S100 is implemented to detect anomalies in new assembly units during production, the method S100 also includes: accessing a second inspection image of a second assembly unit, of the particular assembly type, recorded by the optical inspection station during production of the second assembly unit at a second time succeeding the first period of time; detecting a second set of features in the second inspection image; generating a second vector representing the second set of features in the multi-dimensional feature space; and, in response to the second vector deviating from the set of vector groups by more than a threshold difference, flagging the second assembly unit in Block S150.

2. Applications

Generally, the method S100 can be executed by a local or remote computer system (hereinafter the "system") to: aggregate digital photographic inspection images of assembly units recorded during production; to represent each of these assembly units as a multi-dimensional (e.g., a "n-dimensional") vector embodying multiple (e.g., "n-number" of) features detected and extracted from a corresponding inspection image; and to group these vectors into groups (or "clusters") of vectors exhibiting (relatively) high degrees of similarity in some or all dimensions with a multi-dimensional feature space. In particular, the method S100 can be executed to automatically identify representative features (e.g., corners, edges, surfaces, surface profiles, geometries, relative positions, relative orientations, etc.) from inspection images of many assembly units and to automatically identify groups of similar assembly units—which may exhibit similar aesthetic and functional soundness or defects—based on these features but without direct or explicit knowledge of how these features affect aesthetic and functional soundness of these assembly units.

As described below, the system can execute Blocks of the method S100: to generate asynchronous and real-time predictions of aesthetic and/or functional defects of assembly units; to identify anomalous assembly units based predominantly or exclusively on visual data of these assembly units (and limited test and inspection data); to isolate features that are predictive of defects; and to detect unintended changes occurring during production of assembly units along an assembly line well before these unintended changes affect yield.

2.1 Application: Intelligent Recall and Defect Propagation

In one application shown in FIG. 5, the system: accesses a database of inspection images—of a corpus of assembly units produced in the past—recorded by an optical inspection station arranged after a particular assembly step on an assembly line; segments these inspection images; passes image segments (e.g., a subset of image segments of interest associated with the optical inspection station) from each of these inspection images into a convolutional neural network that detects and extracts features (e.g., thousands of features) from each image segment; and then compiles quantitative representations of these features into one vector for each assembly unit. The system can then: implement structured data analysis techniques (e.g., linear regression analysis, cluster analysis, k-means clustering, and/or other statistical analysis and machine learning techniques) to group vectors representing assembly units into discrete vector groups (hereinafter "clusters"); write inspection results for a small proportion (e.g., 5%) of these assembly units (e.g., presence of a defect, complete functionality) to clusters containing vectors corresponding to these inspected assembly units; and then predict similar defects (or proper function) in other, uninspected assembly units based on proximity of their corresponding vectors to clusters labeled with defect labels (or with proper function labels).

When a newly-identified defect is identified in a particular assembly unit (e.g., in an assembly unit that was previously sold, later returned due to a defect, and inspected), the system can: interface with a user (e.g., an engineer, an operator) to update a record of the particular assembly unit to reflect this defect; automatically label a cluster of vectors containing a particular vector corresponding to the particular assembly unit with this newly-identified defect; identify a set vectors in or near the same cluster as the particular vector in the feature space; and transform this set of vectors into a list of sold assembly units to selectively recall and/or into a list of assembly units still onsite to selectively inspect for this newly-identified defect.

The system can therefore process existing inspection images of completed assembly units asynchronously according to the method S100 in order to identify a subset of these completed assembly units likely to exhibit this newly-identified defect. More specifically, the system can execute Blocks of the method S100 to automatically "look back" through a corpus of inspection images of previously-completed assembly units for assembly units that exhibit features indicative of a newly-identified defect. Such insights generated by the system can then be leveraged by a user (e.g., a design engineer, a quality control engineer, a manufacturing engineer, a manufacturer): to identify and selectively recall assembly units likely to be defective (i.e., rather than an entire batch of assembly units); and/or to guide selective, intelligent inspection and testing of assembly units that are still onsite in order to quickly identify and cull assembly units that are aesthetically or functionally defective prior to shipment out of the facility.

2.2 Application: Real-Time Defect Detection

Figure 4:
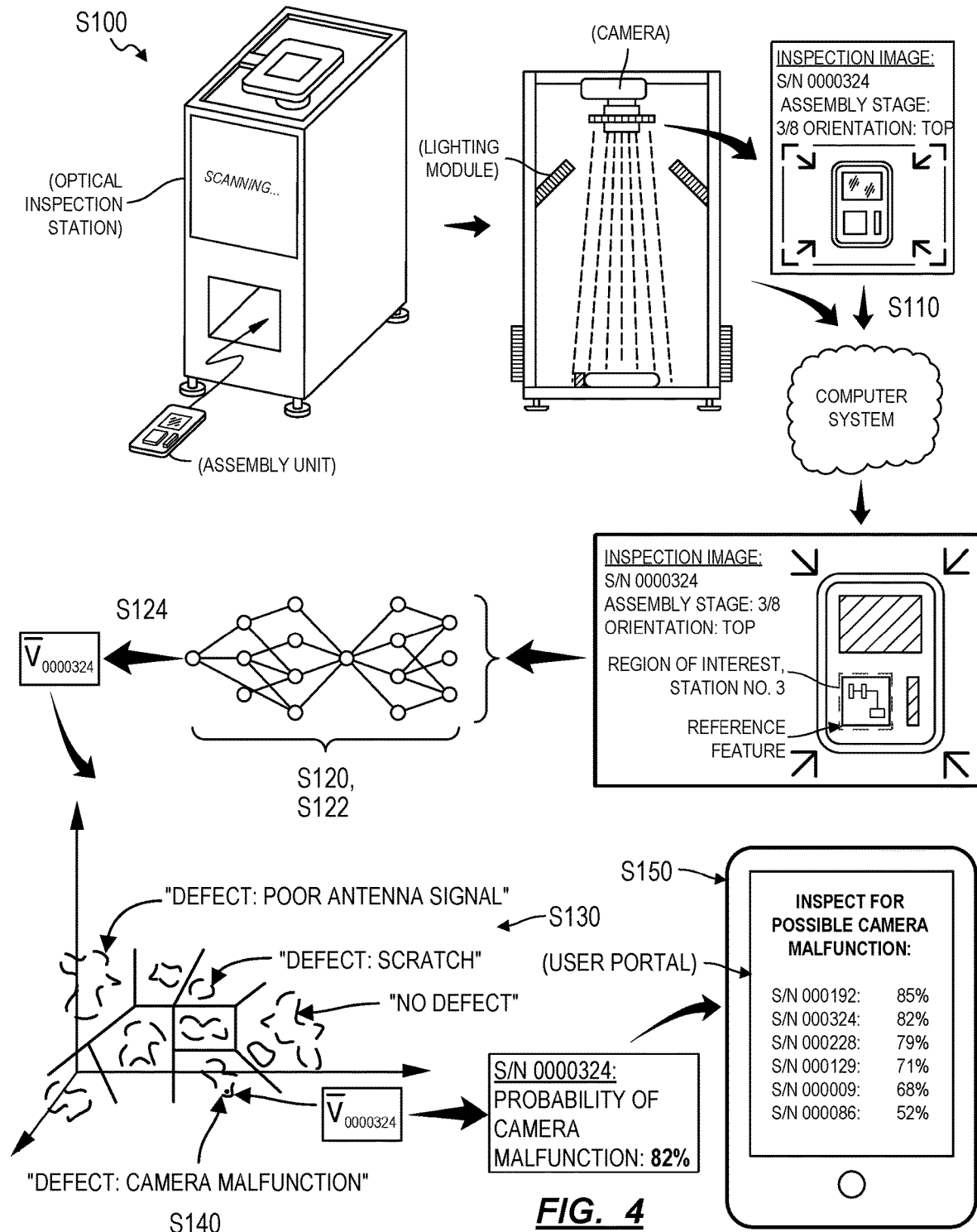
FIG. 4 is a flowchart representation of one variation of the method.

As shown in FIG. 4, the system can similarly execute Blocks of the method S100 substantially in real-time: to compare inspection images of new assembly units—recorded by an optical inspection station during production of these new assembly units—to past assembly units of known outcomes in order to identify particular new assembly units that exhibit features characteristic of past defective assembly units; and to serve prompts to inspect, discard, or rework these particular assembly units in real-time, such as to the optical inspection station or to an operator nearby.

For example, the system can execute Blocks of the method S100 to selectively flag new assembly units that may be defective based on similarity of features detected in inspection images of these new assembly units and features detected in inspection images of past, known-defective assembly units and to issue prompts to a user to address these select new units in order to: reduce waste of operator time, assembly line capacity, and components by culling assembly units determined to be defective even before completion; and improving efficiency of inspection on the assembly line by isolating particular assembly units that may be defective for inspection.

2.3 Application: Real-Time Anomaly Detection

As shown in FIG. 3, the system can also execute Blocks of the method S100 in real-time to: receive an inspection image of a new assembly unit; to extract features from this inspection image; to compare these features to features extracted from inspection images of other assembly units (e.g., of known outcomes); and to flag this new assembly unit as anomalous if this new assembly unit exhibits a feature or a group of features that are not present in or that are substantially distinct from other assembly units. For example, the system can flag the new assembly unit if a vector representing features extracted from the inspection image of the new assembly unit fails to intersect one existing cluster of vectors associated with assembly units of known outcomes or that fails to fall within a threshold difference (e.g., a threshold distance in Euclidean space) of a nearest existing cluster in the multi-dimensional feature space.

Because the outcome of the new assembly unit (e.g., whether the new assembly unit exhibits any aesthetic or functional defect) is not known, the system can prompt a user (e.g., a technician, an assembly line operator, or an engineer) to inspect the new assembly unit for defects, such as in its current assembly state and/or upon completion of the new assembly unit. In the foregoing example, the system can then define a new cluster containing the vector representing this new assembly unit, label this new cluster with an inspection result of the new assembly unit, and predict similar outcomes for future assembly units that exhibit similar features. The system can therefore execute Blocks of the method S100: to detect assembly units that are anomalous within a population of assembly units; to issue selective, intelligent prompts to inspect such anomalous assembly units; and to improve a model linking assembly unit features to assembly unit outcomes based on inspection results of such anomalous assembly units.

2.4 Application: Defect Source Isolation

By also identifying a set of features common to a first set of assembly units exhibiting a defect but not common to (e.g., excluded from) a second set of assembly units not exhibiting this defect, the system can filter a relatively large feature set down to a compressed feature set exhibiting a greater likelihood of producing the defect, as shown in FIG. 2. By scanning inspection images of other assembly units—of the same or different assembly type—for similarity to this compressed feature set, the system can detect or predict similar defects in these other assembly units even if the source of the defect is not immediately known to an engineer.

The system can also present this limited feature set to a user (e.g., an engineer) for manual labeling and identification of specific features in this set that the user hypothesizes or has confirmed contributed to the defect. In particular, though the system can extract thousands or millions of features from an inspection image and process these features to identify both assembly units that exhibit similarities to past assembly units of known outcomes and anomalous assembly units, this large number of features may be too large for one or several humans to comprehend. Therefore, by comparing features extracted from inspection images of sound and defective assembly units, the system can: isolate a particular subset (e.g., dozens) of features exhibiting strongest correlation with this defect; highlight regions of inspection images containing these particular features; and present these highlighted inspection images to a user (e.g., through a user portal) for consideration of the source of this defect.

The system can thus guide a human user to test correlations between select features and a defect, to confirm causation between these features and the defect, and to label these features accordingly, thereby enabling supervised machine learning pathways via intelligent presentation of select inspection images—or select regions of interest of these inspection images—predicted by the system to contain features indicative of the defect.

2.5 Application: Real-Time Yield Protection

Furthermore, the system can execute Blocks of the method S100 to detect a trend (or "drift") of features of new assembly units produced on the assembly unit toward features characteristic of past defective assembly units and/or away from features characteristic of past non-defective assembly units, even before such unintended changes result in a decrease in yield on the assembly line, as shown in FIG. 6. For example, characteristics of assembly units produced on an assembly line may trend or "drift" in a particular direction over time due to tooling wear, fixture wear, decreased oversight (e.g., per unit as production rate increases), personnel changes, etc. Though assembly units produced early in the course of this trend may be non-defective and through this trend may not initially affect yield at the assembly line, this trend may lead to defective assembly units over a longer period of time (and may be more difficult to correct) if not timely addressed.

The system can therefore: derive a trend of new vectors—representing a new sequence of assembly units imaged by an optical inspection station along the assembly line—toward a cluster of vectors labeled with a defect; and/or derive a trend of new vectors away from (e.g., outwardly from) a cluster of vectors labeled as non-defective. If a strength or rate of this trend exceeds a threshold, the system can then prompt inspection of a segment of the assembly preceding the optical inspection station for a possible source of this trend, thereby enabling an engineer or technician to quickly verify and address this trend, such as by reinforcing protocols for operators on the assembly line or replacing tooling upstream of the assembly line (e.g., an injection mold).

The system can therefore execute Blocks of the method S100 to detect unintended changes within production of assembly units and to prompt inspection and correction of these changes prior to a substantive decrease in yield on the assembly line based on features extracted from inspection images of these assembly units recorded by optical inspection stations arranged along the assembly line.

3. System

Blocks of the method S100 can be executed by a system, such as: locally on a system integrated into an optical inspection station (as described below) at which inspection images of assembly units are recorded; locally at a system near an assembly line populated with optical inspection stations; or remotely by a remote server connected to optical inspection stations via a computer network (e.g., the Internet), etc. The system can also interface with a user portal—such as accessible through a web browser or native application executing on a laptop computer or smartphone—to serve prompts and notifications to a user (e.g., an engineer or assembly line worker) and to receive feature and cluster labels entered manually by a user.

Furthermore, the method S100 is described below as executed by the system to detect anomalies and/or defects in assembly units containing two or more discrete components. However, the method S100 can be similarly implemented by a system to detect anomalies and/or defects in singular parts (e.g., molded, cast, stamped, or machined parts) based on inspection images of these singular parts.

All or select Blocks of the method S100 can additionally or alternatively be executed locally at the assembly line, such as by an optical inspection station once the optical inspection station records an inspection image of a new assembly unit inserted into the optical inspection station for automated imaging and optical inspection.

4. Optical Inspection Station and Inspection Images

Block S110 of the method S100 recites accessing a set of inspection images of a set of assembly units, of a particular assembly type, recorded by an optical inspection station during production of the set of assembly units. Generally, in Block S110, the system accesses inspection images recorded by an optical inspection station during assembly of assembly units. For example, the system can retrieve inspection images recorded by an optical inspection station, uploaded from the optical inspection station to a file system (e.g., a database) via a computer network, and stored in a database. The system can additionally or alternatively retrieve inspection images directly from the optical inspection station, such as in real-time when an inspection image of an assembly unit is recorded by the optical inspection station.

As described in U.S. patent application Ser. No. 15/653,040, filed on 18 Jul. 2017, which is included in its entirety by this reference, an optical inspection station can include: an imaging platform that receives a part or assembly; a visible light camera (e.g., a RGB CMOS, or black and white CCD camera) that captures inspection images (e.g., digital photographic color images) of units placed on the imaging platform; and a data bus that offloads inspection images, such as to a local or remote database. An optical inspection station can additionally or alternatively include multiple visible light cameras, one or more infrared cameras, a laser depth sensor, etc.

In one implementation, an optical inspection station also includes a depth camera, such as an infrared depth camera, configured to output depth images. In this implementation, the optical inspection station can trigger both the visible light camera and the depth camera to capture a color image and a depth image, respectively, of each unit placed on the imaging platform. Alternatively, the optical inspection station can include optical fiducials arranged on and/or near the imaging platform. In this implementation, the optical inspection station (or a local or remote computer system interfacing with the remote database) can implement machine vision techniques to identify these fiducials in a color image captured by the visible light camera and to transform sizes, geometries (e.g., distortions from known geometries), and/or positions of these fiducials within the color image into a depth map, into a three-dimensional color image, or into a three-dimensional measurement space (described below) for the color image, such as by passing the color image into a neural network.

Upon receipt or retrieval of an inspection image, the system can "dewarp," "flatten," or otherwise preprocess the inspection image in Block S110 in preparation for detecting and extracting features from the inspection image in Blocks S120 and S122, as described in U.S. patent application Ser. No. 15/407,158, filed on 16 Jan. 2017, which is incorporated in its entirety by this reference. The system can also: implement computer vision techniques (e.g., object recognition, edge detection, etc.) to identify a perimeter or boundary of the assembly unit in the inspection image; and then crop the inspection image around the assembly unit such that only features corresponding to the assembly unit are extracted from the inspection image and processed in Blocks S120, S122, etc. of the method S100.

The system can thus aggregate a set of (e.g., 100, 1 k, or 100 k) inspection images (e.g., digital color photographic image) recorded over a period of operation of an assembly line in Block S110, wherein each inspection image records visual characteristics of a unique assembly unit at a particular production stage. However, the system can access inspection images of any other type and in any other way in Block S110.

5. Feature Extraction and Vector Generation

The method S100 also includes Blocks S120, S122, and S124, which recite, in each inspection image in the set of inspection images: detecting a set of features in the inspection image; extracting the set of features from the inspection image; and generating a multi-dimensional vector, in a set of vectors, representing the set of features, respectively. Generally, the system identifies multiple (e.g., "n," or "many") features representative of an assembly unit shown in an inspection image in Block S120, characterizes these features in Block S122, and aggregates these features into a multi-dimensional (e.g., "n-dimensional") vector or "fingerprint" uniquely representing this assembly unit—such lengths, angles, relative positions, relative orientations, geometries, profiles, etc. of these features—in Block S124.

In one implementation, the system can implement a feature classifier that defines types of single-order features (e.g., corners, edges, areas, gradients, etc.), second-order features constructed from multiple single-order features (edge orientation and gradient magnitude of an edge, polarity and strength of a blob), relative positions and orientations of multiple features, and/or prioritization for detecting and extracting these features from an inspection image, etc. The system can then apply this feature classifier to the full height and width of a region of the inspection image representing the assembly unit. For example, the system can implement: low-level computer vision techniques (e.g., edge detection, ridge detection); curvature-based computer vision techniques (e.g., changing intensity, autocorrelation); and/or shape-based computer vision techniques (e.g., thresholding, blob extraction, template matching); etc. according to the feature classifier to detect n-number of highest-priority features representing the assembly unit in the inspection image in Block S120.

The system can then extract a local image patch around these features in Block S122, such as in the form of a multi-dimensional (e.g., n-dimensional) feature vector (hereinafter a "vector") representing multiple (e.g., thousands, millions) features extracted from the inspection image. The vector can thus define a "fingerprint" that uniquely represents the assembly unit captured in the inspection image.

The system can repeat this process for other inspection images—such as by processing these inspection images in a batch or by processing new inspection images individually upon receipt from an optical inspection station—to generate vectors uniquely representing corresponding assembly units.

5.1 Zoom+Region of Interest

In one implementation shown in FIGS. 3 and 4, the system limits feature detection and extraction in an inspection image to a region of interest in the inspection image defined or bound manually by a user. In particular, the system can be configured to extract a preset number of (e.g., two thousand) features from an inspection image; by reducing a scan area of the inspection image, the system can detect and extract a higher density of features from this reduced scan area than from the full assembly unit area of the inspection image.

Generally, given a fixed vector length, the system can: extract a lower density of features from a full height and width of a region of an inspection image corresponding to an assembly unit; and extract a greater density of features from a subregion of the inspection image corresponding to the assembly unit. The system can implement the former technique by default in order to characterize an assembly unit generally. However, if a user (e.g., an engineer) is testing an hypothesis for a source of a defect within a particular subregion of an assembly type, has sourced a root cause of a defect to a particular subregion of an assembly type, or has identified a defect in a particular subregion of an assembly type, the user can select this particular subregion of the assembly unit to bound detection and extraction of the fixed number of features from the inspection image; the system can then extract a higher density of features from this bounded region of inspection images of assembly units, which may enable the system to detect and characterize smaller features that may contribute (significantly) to a defect in the assembly unit but which may have otherwise been assigned lower priorities by the feature classifier.

In one implementation, the system can implement methods and techniques described in U.S. patent application Ser. No. 15/407,158 to: serve an inspection image to a user through a user portal executing on a computing device (e.g., a mobile computing device, a tablet, or a desktop computer); enable the user to zoom into (or "expand") a region of the inspection image; and then define a boundary (e.g., a rectangular "zoom window") around this region of the inspection image. In this implementation, the user can thus define a "region of interest" of the inspection image depicting a region of an assembly unit: that changed from a preceding production stage to a depicted production stage of the assembly unit; in which the user anticipates a manufacturing defect occurring; and/or that the user desires to track for manufacturing changes. In particular, the system can host the user portal and serve an inspection image of an assembly unit to the user portal for selection of a region of interest in this inspection image, which corresponds to a region of interest in the assembly unit.

In this implementation, the system can then store this region of interest and associate this region of interest with the optical inspection station that recorded the inspection image. (Alternatively, the system can associate this region of interest with the particular production stage and orientation of the assembly unit relative to an optical inspection station when the inspection image was recorded.) For example, the system can: automatically detect a reference feature in the inspection image or prompt the user to select the reference feature in the inspection image rendered in the user portal, such as a top-left corner of the assembly unit or a corner of a component on the assembly unit visible in the inspection image; define a lateral position, longitudinal position, orientation, width, and height of the region of interest relative to this reference feature in the inspection image; and store the lateral position, longitudinal position, orientation, width, and height in association with the optical inspection station. The system can then selectively detect features in this region of interest of the inspection image in Block S120 and generate a vector that represents this region of the assembly unit in Block S124. (Alternatively, the system can append an existing vector assigned to this assembly unit with representations of these features and repeat this process at other production stages of the assembly unit to generate a signal vector assigned to this assembly unit and containing representations of feature sets extracted from regions of interest of a series of inspection images of the assembly unit recorded during production of the assembly unit over time.)

With the region of interest for the optical inspection station (or for assembly type and production stage of the assembly unit) thus defined, the system can project the region of interest onto inspection images of other assembly units recorded by the optical inspection station (or of the same assembly type and at the same production stage) based on similar reference features detected in these inspection images. For example, the system can: implement object detection, object recognition, or template matching techniques to identify the reference feature described above in inspection images of other assembly units at the same production stage; and orient the region of interest on these other inspection images automatically based on lateral position, longitudinal position, orientation, width, and height values of the region of interest assigned to this optical inspection station. Alternatively, the system can define the region of interest relative to a global reference on the inspection image, such as a top-left corner of the inspection image. The system can then: detect feature sets in these bounded regions of interest in these other inspection images in Block S120; compile these feature sets into vectors assigned to corresponding assembly units in Block S124; and then compare these vectors—representing similar regions of interest in inspection images of many assembly units—to identify clusters of vectors representing similar assembly units in Block S130.

In another implementation, if a defect in a first assembly unit is identified through testing or inspection, a user may access the user portal to label a first inspection image of the first assembly unit as defective and to select a region of interest (or "zoom window," or "boundary") around a location of this defect depicted in a first inspection image of the first assembly unit. The system can thus link this region of interest with both the optical inspection station (or the with this production stage and assembly unit orientation) and the particular defect. The system can then: project this region of interest onto inspection images of assembly units recorded by this optical inspection station; detect feature sets in these bounded regions of interest in these inspection images in Block S120; compile these feature sets into vectors assigned to corresponding assembly units in Block S124; identify a first cluster of vectors—including a first vector associated with the first assembly unit—representing assembly units likely to exhibit the particular defect; and identify another cluster of vectors representing assembly units less likely or unlikely to exhibit the particular defect.

Therefore, the system can: enable the user to manually select an area of interest on an assembly unit shown within an inspection image in order to leverage the user's understanding of defects, problematic areas, or key functions of the assembly unit; project this region of interest onto many inspection images of assembly units in production on the assembly line; extract features at greater resolution, smaller features, and/or features assigned lower weight or lower priority by the feature classifier from like regions of interest in the inspection images; and then generate vectors (or other data containers) that represent these features extracted from comparable regions of interest across these inspection images. In particular, the system can generate (or append) vectors based on features extracted from focused regions of interest in inspection images of like assembly units, thereby necessitating less time and computing power to generate higher-resolution representations of key regions of assembly units for comparison in Block S130, which may improve accuracy and resolution of subsequent defect, anomaly, and production drift detection described below.

5.2 Image Segmentation

In one variation shown in FIG. 3, when processing an inspection image of an assembly unit, the system: divides the inspection image into a set of image segments (e.g., 224-pixel square "crop areas"); and selects a subset of image segments—in this set of image segments—that corresponds to an assembly unit region of interest associated with the optical inspection station—in a set of optical inspection stations arranged along an assembly line—that recorded the inspection image. The system can then: extract a subset of features from each image segment in this subset of image segments; compile these subsets of features—extracted from the subset of image segments intersecting the assembly unit region of interest in the inspection image—into one set of targeted features in the inspection image in Block S122; and generate a vector representing this set of targeted features in the multi-dimensional feature space in Block S124.

Therefore, the system can divide the inspection image into image segments and then select a subset of these image segments that intersects a region of interest that was previously specified by a user for the optical inspection station that recorded the inspection image or that was previously assigned to assembly units of the same type and at the same production stage. The system can then extract features from each of these select image segments and compile these features into one vector that represents a region of interest on the assembly unit of this time and at this production stage.

5.3 Vectors and Production Stage

In the foregoing implementations, the system can thus: generate one vector per assembly unit imaged at one optical inspection station along the assembly line; and then compare vectors corresponding to this particular assembly type, production stage, and assembly orientation to detect or predict defects in assembly units—asynchronously or in real-time—occurring during production steps preceding this optical inspection station, as described below.

Alternatively, the system can implement the foregoing methods and techniques: to assign one or more regions of interest to each optical inspection station along the assembly line; to access a sequence of inspection images of one assembly unit recorded by these optical inspection stations during assembly of the assembly unit; and to detect and extract features from these regions of interest in these inspection images of the assembly unit. The system can then compile these features—extracted from a sequence of inspection images of the singular assembly unit recorded by multiple optical inspection stations during production of the assembly unit over time—into one vector that represents characteristics of the assembly unit throughout its production. The system can repeat this process to generate comparable vectors for other assembly units and to then compare these vectors to detect or predict defects in these assembly units occurring at various manufacturing steps along the assembly line, as described below.

5.4 Region of Interest Labels

In the foregoing implementations, the system can also enable a user to label regions of interest with searchable textual labels or "tags" (e.g., keywords), such as "battery", "speaker", "antenna", "fastener", "touchscreen," or "ribbon cable."

For example, when a defective assembly unit is later identified and a defect mode determined (e.g., "battery failure", "speaker failure", "antenna failure", "fastener missing", "touchscreen failure," or "ribbon cable break"), the user can: search tags of crop areas of interest—assigned to optical inspection stations along the assembly line—for a subset of crop areas of interest that may contain features related to this failure; select a particular crop area from this subset that the user hypothesizes contains a source of the defect in the defective assembly unit; and select this particular crop area in an inspection image of the defective assembly unit. Once the system loads this particular crop area into the user portal for rendering for the user, the user can: confirm that the particular crop area generally contains the source of the defect; or select (or "highlight") a region of interest within the particular crop area of interest that the user is confident contains the source of the defect. The system can then: label this crop area of interest or region of interest with this defect; extract features from this crop area of interest or region of interest; compile these features into a representative vector in multi-dimensional feature space; repeat this process to generate vectors representing features extracted from the same crop area of interest or region of interest of inspection images of other assembly units; and predict the same defect mode in other assembly units based on proximity of corresponding vectors to the representative vector, as described below. (In particular, the system can estimate probability of the same defect in these other complete assembly units based on proximity of corresponding vectors to the representative vector in the multi-dimensional feature space.)

The system can implement similar methods and techniques: to generate a new vector from features extracted from the same crop area of interest or region of interest in a new inspection image of a new assembly unit recently recorded by the optical inspection station; and to estimate probability of the same defect in the new assembly unit—substantially in real-time—based on proximity of the new vector to the representative vector in the multi-dimensional feature space, as described below.

6. Vector Groups

Block S130 of the method S100 recites grouping vectors, in the set of vectors, into a set of discrete clusters, as shown in FIGS. 1, 3, and 4. Generally, in Block S130, the system implements structured data analysis techniques (e.g., linear regression analysis, cluster analysis, k-means clustering, and/or other statistical analysis and machine learning techniques) to partition the set of vectors—each uniquely representing multiple features of one assembly unit—into multiple groups or "clusters" of vectors representing similar combinations of features and/or similar feature ranges in one or more dimensions in the multi-dimensional feature space.

7. Initial Labeling and Outcome Propagation

One variation of the method S100 includes Block S140, which recites labeling a first cluster, in the set of clusters, with a particular defect indicated in inspection results of a first subset of assembly units, in the set of assembly units, associated with vectors in the first cluster. Generally, in Block S140, the system links test and/or inspection data of a particular assembly unit to a vector representing this assembly unit and then associates these test and/or inspection data with a particular cluster containing the particular vector.

In one implementation, the system automatically accesses test data, inspection results, and/or other observations entered manually by a user and linked to serial numbers of assembly units, such as by retrieving these data from a database. The system can then extract various defect labels from these data, such as: poor battery life; speaker malfunction or audio distortion; poor wireless signal quality; button malfunction; overheating; total system failure; sensor malfunction or noisy sensor signal; unresponsive touchscreen; distorted display; scratches; dents; and/or rough or uneven surface finish; etc. The system can similarly extract soundness labels from these data, such as confirmation that defined functional and/or aesthetic requirements have been met. The system can also link these defect and/or soundness labels to assembly unit serial numbers specified in these test, inspection, and/or other data and then write these labels to clusters containing vectors representing these serial numbers in Block S140.

The system can additionally or alternatively prompt a user—via the user portal—to manually tag vectors and/or clusters with defect labels. For example, the system can select a first cluster (e.g., containing no or fewer than a minimum number of labels), identify a particular vector representative of the cluster (e.g., nearest a centroid of the cluster), retrieve a particular inspection image from which the particular vector originated, and then prompt the user to select a preexisting label or to enter a new label describing soundness or a defect of the particular assembly unit shown in the particular inspection image. In this example, the system can enable the user to select or enter a label indicating whether a scratch is visible in the particular inspection image, whether the particular inspection image shows that a specified component is missing, or whether the assembly unit shown in the particular inspection image is known to be defective, etc. The system can then map this label of the particular assembly unit onto the first cluster.

In the foregoing implementation, if the system defines multiple clusters in Block S130, the system can: select a subset of (e.g., one, five) vectors representative of each cluster; prompt the user to label the inspection image corresponding to these representative vectors with aesthetic and/or functional defect and soundness tags until each cluster contains a sufficient number of labels to predict defects in other assembly units represented in these clusters.

The system can also prompt the user to manually tag specific features with soundness or defect labels. For example, the system can: prompt the user to select one or a set of features (e.g., one edge, one surface or area, two edges, an edge and a corner, etc.) within the inspection image; prompt the user to label the selected feature(s) as representative of soundness or of a defect; and tag the selected feature(s) (e.g., presence of a feature, a length of a feature, distance or angle between two features, an area of a feature, a geometry or profile of a feature, etc.) with a defect label entered by the user.

In one example, the system: selects a first vector associated with a first assembly unit and representative of a first cluster of vectors associated with a negative outcome (e.g., presence of a particular defect); selects a second vector associated with a second assembly unit and representative of a second cluster of vectors associated with a positive outcome (e.g., absence of the particular defect); detects a common reference feature in a first inspection image of the first assembly unit and a second inspection image of the second assembly unit at the same product stage; and virtually aligns the first and second inspection images (or regions of interest in the first and second inspection images) according to this common reference feature, such as described above and in U.S. patent application Ser. No. 15/653,040. The system can then serve first and second inspection images to a user portal such as rendered within a web browser or native application executing on a smartphone, tablet, or desktop computer. The user portal can then toggle between rendering the first inspection image and rendering the second inspection image—virtually aligned by the common reference feature—such as at a rate of 1 Hz or when triggered by a user, which may enable the user to quickly discern differences between like regions of interest in the first and second assembly unit and which may enable the user to isolate a source of a defect present in the first assembly unit but not in the second assembly unit. In this example, the user portal can also animate a transition from rendering the first inspection image to rendering the second inspection image—again virtually aligned in rotation and orientation by the common reference feature—which may further enable the user to visually detect differences between the first and second assembly units. The user can then select and label key features in the first inspection image that the user knows or hypothesizes contributed to a functional defect or which represent an aesthetic defect, and the system can leverage such feedback from the user to refine a model of feature sets predicting positive or negative assembly unit outcomes, as described below.

By thus labeling a cluster of vectors with test and/or inspection data of assembly units represented by vectors contained in the cluster, the system can: infer soundness, aesthetic defects, and/or functional defects of other assembly units represented by vectors in this cluster based on these limited test and/or inspection data; and/or isolate features indicative of such aesthetic and/or functional defects, such as by comparing features represented in different clusters. For example, the system can group a population of vectors in multiple clusters, wherein each cluster containing tens or hundreds of vectors and ones or tens of vectors labels with outcomes (e.g., presence and types of defects) of their corresponding assembly units. In this example, the system, can thus: predict presence of this particular defect in other assembly units associated with the other unlabeled vectors in the first cluster; and serve a prompt to a user (e.g., a manufacturing engineer associated with the assembly line, a technician on the assembly line) to inspect these other assembly units for the particular defect, such as in real-time as these other assembly units are assembled or asynchronously by retrieving these assembly units from a stock room. Similarly, the system can: define a second cluster containing hundreds of vectors, including tens of vectors associated with assembly units confirmed to exclude the particular defect and labeled as non-defective; predict absence of the defect in assembly units associated with unlabeled vectors in the second cluster; and generate a list of serial numbers of these assembly units to exclude from inspection for this particular defect.

8. Exploration and Problem Solving: Upstream Defect Detection

As shown in FIGS. 1 and 5, one variation of the method S100 includes: generating a prompt to inspect assembly units associated with vectors in the first cluster for the particular defect in Block S150. Generally, in Block S150, the system can propagate detection of an aesthetic or functional defect across a set of units responsive to detection of this defect in one or a small number of assembly units.

In one implementation, if a new functional or aesthetic defect is first identified in a particular assembly unit after multiple (e.g., 100 or 100 k) like assembly units are produced, the system can: label a first cluster—containing a particular vector representative of the particular assembly unit—with the defect in Block S130; and flag a set of serial numbers corresponding to each other vector in the first cluster for additional testing or inspection related to the newly-identified defect. For example, the system can generate a list of serial numbers to test for this defect before shipping this batch of assembly units. In another example, if these serial numbers have been marked as shipped or delivered, the system can generate a list of serial numbers to selectively recall due to possibility of this defect (i.e., rather than all shipped assembly units).

In another example, the system receives a query from a user (e.g., an engineer) for a first inspection image for a first assembly unit in which a newly-identified defect was recently detected, such as in the form of a search query including a serial number of the first assembly unit entered through a user portal executing on the user's computing device. In this example, the first assembly unit may have been completed, vended (e.g., to a customer or distributor), and later returned to the manufacturer as defective. In this example, the system can then: serve a series of inspection images recorded throughout production of the first assembly unit to the user portal; receive an indication of a particular defect in a first inspection image—in this series of inspection images—of the first assembly unit at a particular production stage; receive manual selection of a region of interest in the first inspection image via the user portal, wherein the region of interest in the first inspection image is predicted by the user to depict a source of the newly-identified defect; and store this region of interest with a label for this newly-identified defect. The system can then scan a population of inspection images of other completed assembly units and/or assembly units currently in-process for the same defect. In particular, the system can access inspection images of other assembly units at the same production stage. For each of these inspection images, the system can then: project the region of interest from the first inspection image onto an inspection image of another assembly unit; extract a set of features from the region of interest in the inspection image; and compile these features into a vector representing this region of interest in this other assembly unit. Finally, the system can: regroup vectors—in the population of vectors thus generated from features extracted from this region of interest across many inspection images of these many assembly units—based on proximity in the multi-dimensional feature space; and predict presence of the newly-identified defect in a subset of assembly units associated with a subset of these vectors that fall in (or substantially near) a vector group containing a first vector that represents this region of interest in the first assembly unit. The system can then automatically: generate a first list of serial numbers that correspond to assembly units in this subset of assembly units and that were previously vended (e.g., delivery to a customer or distributor); generate a second list of serial numbers that correspond to assembly units in this subset of assembly units but that have not yet been vended (e.g., that are still onsite); and/or generate a third list of serial numbers that correspond to assembly units in this subset of assembly units and that are still in the process of assembly.

The system can execute this process substantially in real-time—following receipt of indication of a newly-identified defect in one assembly unit—to scan and identify other assembly units that may exhibit the same defect (exclusively) from historical optical data recorded during production of these assembly units. For example, the user or the manufacturer can then: leverage the first list of serial numbers to issue selective, targeted recall of only these assembly units predicted to be defective, such as before this defect substantively affects customers of these assembly units; leverage the second list of serial numbers to selectively retrieve and inspect these assembly units for this defect prior to delivery to a customer or distributor; and/or leverage the third list of serial numbers to discard these assembly units or flag these assembly units for rework.

The system can therefore predict defects in certain past assembly units by identifying vectors—representing these assembly units—that are sufficiently near a particular vector representing a defective assembly unit across multiple (e.g., "n") dimensions.

8.2 Selective Defect Check

In this variation, the system can also: select a second assembly unit associated with a second vector proximal the first vector and currently onsite or otherwise accessible for inspection; prompt a user to inspect the second assembly unit and to indicate whether a newly-identified functional defect is present; and then regroup clusters of vectors according to the user's feedback in order to refine or confirm a larger list of assembly units predicted to exhibit this same functional defect.

Similarly, if the newly-identified defect is aesthetic, the system can retrieve an inspection image of a second assembly unit predicted to exhibit the same aesthetic defect (e.g., nearest the first vector representing the first assembly unit confirmed to exhibit this aesthetic defect), serve this inspection image to the user, prompt the user to confirm presence of the aesthetic defect, and refine or confirm a larger list of assembly units predicted to exhibit this same aesthetic defect—even if the second assembly unit is not immediately available for physical inspection by the user.

The system can similarly: identify select assembly units represented by vectors further from the first vector in the multi-dimensional feature space; prompt the user to physically or visually inspect these select assembly units for the newly-identified defect; and refine a boundary (or "manifold") around a cluster of vectors likely to exhibit this newly-identified defect and separate from other vectors unlikely or less likely to exhibit this defect based on inspection results provided by the user. For example, the system can: label a first cluster of vectors containing the first vector representing the first assembly unit known to exhibit the newly-identified defect; label a second cluster of vectors containing a second vector representing a second assembly unit known to exclude the newly-identified defect based on past inspection results; and generate a prompt to inspect a third assembly unit—associated with a third vector that falls between the first cluster and the second cluster in the multi-dimensional feature space—for the newly-identified defect. Given inspection results provided by the user for the third assembly unit, the system can expand one of the first and second clusters to include the third vector and repeat this process to increase the system's confidence in a boundary between the first cluster associated with the defect and the second cluster associated with absence of the defect. For example, upon receiving confirmation of absence of the defect in the third assembly unit responsive to the prompt to inspect the third assembly unit, the system can: calculate a revised manifold containing the first vector, excluding the third vector, and extending between the first vector and the second vector (or otherwise delineating volumes occupied by groups or clusters of vectors in the multi-dimensional feature space); and generating a fourth prompt to inspect a fourth assembly unit associated with a fourth vector, contained within the revised manifold of the first cluster, for the defect.

Therefore, by selecting key assembly units—represented by vectors that fall between a first cluster containing a first vector labeled as defective and a second cluster containing a second vector labeled as non-defective—for further inspection and prompting a user to indicate outcomes of these key assembly units, the system can quickly define a perimeter or boundary between defective units and non-defective units (at least for a particular defect) in the multi-dimensional feature space based on a minimum of human-generated inspection information.

8.3 Defect Probability and Inspection Rank

In this variation (and other variations described herein), the system can also calculate probability of a defect in a second assembly unit based on proximity of a second vector—representing the second assembly unit of unknown outcome—to a first vector representing a first assembly unit known to exhibit this defect, as shown in FIG. 4. For example, upon receipt of indication of a newly-identified defect in a first assembly unit represented by a first vector, as described below, the system can: calculate distances of other vectors—representing similar regions of interest in assembly units of the same type and at the same production stage—to the first vector in the multi-dimensional feature space; and calculate probabilities that the defect is present in each of these assembly units as a function of (e.g., inversely proportional to) these distances. The system can then prompt a user to inspect assembly units according to probability of this defect. For example, the system can serve a list of serial numbers of assembly units in order of probability of exhibiting the defect, starting with a second assembly unit associated with a greatest probability of exhibiting the defect (e.g., represented by a second vector nearest the first vector) down to a threshold probability (e.g., 20%) of exhibiting the defect. The user can then inspect these assembly units in the order indicated in this list, such as until an assembly unit that does not exhibit the defect is reached.

9. Real-Time Single-Unit Yield Protection

As shown in FIG. 4, the system can similarly implement Blocks S140 and S150 substantially in real-time to predict defects in assembly units during production. In one implementation, the system: receives a new inspection image of a new assembly unit recently recorded at an optical inspection station during production of the new assembly unit; detects a new set of features in the new inspection image; extracts the new set of features from the new inspection image; generates a new multi-dimensional vector representing the new set of features; and then flags the new assembly unit if the new vector representing the new assembly unit intersects a particular cluster labeled with a defect or containing a vector tagged with a defect. For example, after generating the new vector, the system can locate the new vector in the particular cluster by implementing structured data analysis techniques, such as a k-nearest neighbor classifier (e.g., where k=1). The system can then prompt a user (e.g., an assembly line operator or an engineer near the assembly line) to reject or correct the new assembly unit, such as by sending a notification to the optical inspection station or to a mobile computing device associated with the user before the new assembly unit leaves the optical inspection station. The system can also send a command to a robotic system proximal the optical inspection station to discard the assembly or to place the new assembly in a rework bin before the new assembly unit moves to a next stage of assembly.

For example, if the defect associated with the particular cluster—and now with the new assembly unit—is tagged as catastrophic, the system can serve a prompt to the user to discard the new assembly unit. However, if the defect associated with the particular cluster is tagged as correctable, the system can serve a prompt to the user to correct the new assembly unit and a predefined instruction for rectifying the defect. For example, if the predicted defect in the new assembly unit is known to be correctable, the system can: flag this new assembly unit for rework; retrieve the new inspection image of the assembly unit; highlight a feature representative of the predicted defect or a region of interest predicted to contain the defect in the new inspection image (e.g., based on defective feature labels in inspection images of other assembly units represented in the particular cluster); and then serve this inspection image with a textual instruction to review the highlighted region and to consider the new assembly unit for rework to a local computing device. In this example, the system can serve this inspection image and instruction to the optical inspection station—currently housing the new assembly unit—for immediate rendering for a user (e.g., a technician or operator nearby) or serve this inspection image and instruction to a mobile computing device (e.g., a smartphone or tablet) linked to the user for immediate (e.g., real-time) presentation.

In the foregoing examples, the system can additionally or alternatively issue an alarm to reject or correct the new assembly unit directly through the optical inspection station, such as triggering an audible or visual alarm to set aside the new assembly unit for further testing or inspection before resuming assembly.

Therefore, the system can implement methods and techniques described above to: extract features in a region of interest—defined for an assembly type, orientation, and production stage—in a new inspection image of a new assembly unit; to compile the features into a new vector representing the region of interest on the new assembly unit; and compare these new vectors to vectors representing like regions of interest of past assembly units of known outcomes and/or to clusters of vectors associated with certain known defects in order to calculate a probability that the new assembly unit exhibits one or more known defects. The system can then selectively prompt various actions related to the new assembly unit accordingly. For example, the system can reference a set of rules, such as defined by a user, to: flag the new assembly unit to be discarded if the probability of a terminal defect in the new assembly unit exceeds a corresponding threshold (e.g., 60%); flag the new assembly unit for rework if the probability of a reworkable defect in the new assembly unit exceeds a corresponding threshold (e.g., 40%); flag the new assembly unit for further manual inspection upon its completion if the probability of at least one defect in the new assembly unit at this production stage exceeds a corresponding threshold (e.g., 20%); and pass the new assembly unit as likely to be non-defective if the probability of any known defect in the new assembly unit at this production stage is less than a corresponding threshold (e.g., 20%).

10. Anomaly Detection

In a similar variation shown in FIG. 3, upon receipt of a new inspection image of a new assembly unit, the system can generate a new vector representing the new assembly unit and then attempt to match the new vector to an existing cluster of vectors representing past assembly units. For example, the system can implement a k-nearest neighbor classifier to group the new vector with a nearest existing cluster, as described above. However, if a distance from the vector to the centroid of the nearest cluster exceeds a threshold distance (e.g., two standard deviations from an average vector-to-centroid distance for this cluster), the system can flag the new assembly unit as anomalous. For example, the system can serve a prompt to the user to inspect the new assembly unit or to set the new assembly unit aside for testing before resuming its assembly, as described above.

Additionally or alternatively, if a distance from the vector to the centroid of the nearest cluster exceeds a threshold distance (e.g., two standard deviations from an average vector-to-centroid distance for this cluster), the system can index the number of k clusters by "1" and repeat the structured data analysis process described above to recalculate "k+1" clusters to convergence. If the new vector represents the sole vector in a new cluster, the system can again flag the new assembly unit as anomalous. However, if the new cluster contains both the new vector and one or more other vectors, the system can flag both the new assembly unit and assembly units associated with the other vectors in the new cluster for further testing and inspection.

In this variation, when an anomalous assembly unit is thus identified, the system can also implement methods and techniques described above to prompt a user to provide information confirming whether this assembly unit is defective and to label the corresponding vector accordingly. The system can then leverage these feedback from the user to predict similar aesthetic and/or functional outcomes of future assembly units based on proximity to this anomalous assembly unit in the multi-dimensional feature space. The system can therefore regularly recalculate clusters and define new clusters as anomalous assembly units are detected and then labeled by users over time.

The system can implement similar method and techniques to detect an new assembly unit as anomalous—which may be indicative of a defect—based on a distance of a vector representing this new assembly unit to a nearest cluster (e.g., to a centroid of this nearest vector), such as regardless of whether this nearest cluster is labeled with results or outcomes of assembly units vectors contained in this cluster.

10.1 Thresholding and Tuning

In this variation, the system can implement thresholds for detecting anomalous assembly units and can refine these thresholds over time based on feedback provided by a user.

In one example, the system: accesses a new inspection image of a new assembly unit recorded by the optical inspection station during production of the new assembly unit; detects a new set of features in the new inspection image; generates a new vector representing the new set of features in the multi-dimensional feature space; and flags the new assembly unit as anomalous if the new vector deviates from a nearest cluster of vectors by more than a preset low threshold distance. In this example, if the distance between the new vector and the nearest cluster exceeds a high threshold distance greater than the low threshold distance in the multi-dimensional feature space, the system can issue a prompt—such as through the optical inspection station—to inspect the new assembly unit for a defect prior to additional assembly of the new assembly unit. However, if the distance between the new vector and the nearest cluster falls between the low threshold distance and the high threshold distance in the multi-dimensional feature space, the system can serve a prompt to a user to manually inspect or test the new assembly unit upon its completion (i.e., rather than immediately).

The system can also access results of this further inspection of the new assembly unit. For example, a first cluster nearest the new vector—that represents the new assembly unit—is associated with non-defective assembly units and if an inspection result for the new assembly unit indicates complete functionality of the new assembly unit, the system can: increase the (low) threshold distance for identifying assembly units as anomalous; and recalculate a boundary around the first cluster to include the new vector. Similarly, if an inspection result for the new assembly unit indicates presence of a particular defect, the system can modify a boundary of a second cluster of vectors associated with this particular defect to include the new vector; the system can modify the (low) threshold distance for identifying assembly units as anomalous such that this revised threshold would have located this new vector in the second cluster.

However, the system can implement any other techniques or schema to identify assembly units as anomalous, to selectively prompt inspection of these anomalous assembly units, and to revise models for detecting anomalous assembly units based on such inspection results.

10.2 Anomaly Inspection Support

In this variation, once a new assembly unit is identified as anomalous, the system can also assist a user in identifying an anomalous region in this new assembly unit, which may aid the user in confirming presence or absence of a defect in the assembly unit.

In one implementation, the system isolates a dominant feature type of the new vector (e.g., a particular dimension in the new vector in the multi-dimensional feature space) that exhibits greatest deviation from a nearby vector associated with a known outcome. For example, the new vector may align strongly with a vector in a nearby cluster in a large proportion of dimensions in the feature space. However, feature values in a small number of dimensions in the new vector may deviate significantly from feature values in the same dimensions in this nearby cluster. The system can therefore flag this small number of dimensions in the new assembly unit as anomalous. The system can then: locate an "anomalous region of interest" in the new inspection image of the new assembly unit that contains features in this small number of dimensions; and serve the new inspection image to a user portal with the anomalous region of interest highlighted or otherwise indicated, thereby drawing attention to a region of the new assembly unit that is anomalous. A user can then provide feedback regarding presence of a defect in this anomalous region of interest based on visual inspection of the annotated inspection image; alternatively, the user can reference the annotated inspection image to guide dismantling, testing, or other physical inspection of the new assembly unit.

In this variation, the system can also implement methods and techniques described above to rank new assembly units by strength of deviation from clusters of vectors representing known outcomes. For example, upon detecting a set of assembly units represented by vectors that deviate from established clusters of vectors, the system can: rank this set of assembly units as a function of distance from their nearest clusters (or as a function of distance from a particular cluster); and then serve a series of prompts to inspect these assembly units—to a user portal (e.g., executing on a computing device distinct from the optical inspection station)—as a function of rank. Following receipt of inspection results from the user in order of rank, the system can recalculate clusters of vectors in the feature space and refine its assessment of anomalous vectors accordingly.

However, the system can present visual data representative of an anomalous assembly unit to a user in any other way.

11. Features Predictive of Defect

In another variation shown in FIG. 2, the method S100 includes: labeling a first cluster, in the set of clusters, with a defect indicated in inspection results of a first subset of assembly units, in the set of assembly units, associated with vectors in the first cluster; labeling a second cluster, in the set of clusters, with absence of the defect based on inspection results of a second subset of assembly units, in the set of assembly units, associated with vectors in the second cluster; identifying a model set of features common to vectors in the first cluster and excluded from vectors in the second cluster in Block S160; and associating the model set of features with the defect in Block S162. Generally, in this variation, the system implements methods and techniques similar to those described above to isolate features indicative of a defect mode in assembly units of the assembly type.

In one implementation, the system groups a population of vectors—representing assembly units of the assembly type produced previously on the assembly line—into a set of (e.g., two or more) clusters in Block S150. The system then retrieves existing outcome data for these assembly units and/or interfaces with a user to project outcomes of a representative subset of these assembly units onto clusters containing vectors of these representative assembly units. For example, for a first cluster of vectors thus identified in the feature space, the system can: select a first vector representative of the first cluster (e.g., proximal a centroid of the first cluster); serve a first prompt to a user, via a user portal, to inspect a first assembly unit—represented by the first vector—for a defect; and then label the first cluster with a particular defect in response to receipt of a first inspection result indicating presence of the particular defect in the first assembly unit. The system can implement similar methods and techniques to: select a second vector representative of a second cluster (e.g., proximal a centroid of the second cluster) distinct from the first cluster in the feature space; serve a second prompt to the user to inspect a second assembly unit—represented by the second vector—for a defect; and then label the second cluster with absence of the particular defect in response to receipt of a second inspection result that excludes an indication of the particular defect in the second assembly unit. The first and second clusters may thus represent features—in one or more dimensions—that are predictive of presence and absence, respectively, of the particular defect.

The system can then implement methods and techniques similar to those described above to isolate a dominant feature type characteristic of vectors in the first cluster and that exhibit significant deviation from vectors in the second cluster. For example, the system can: calculate a first composite vector representing the first cluster (e.g., an average of vectors in the first cluster), which may contain features representative of the particular defect; and calculate a second composite vector of the second cluster, which may contain features representative of absence of the particular defect. In this example, the first composite vector may align strongly with (e.g., contain similar feature values as) the second composite vector in a large proportion of dimensions in the feature space. However, feature values in a small number of dimensions in the first composite vector may deviate significantly from feature values in the same dimensions in the second composite vector. The system can therefore flag this small number of dimensions as exhibiting strong correlation to the particular defect.

The system can then: automatically locate a region of interest—in a first inspection image of a first assembly unit representative of the first cluster—that contains features in this small number of dimensions; and serve this first inspection image to a user portal with the anomalous region of interest highlighted or otherwise indicated, thereby drawing attention to a region of the first assembly unit that may be the source of the particular defect. A user can then provide feedback regarding presence of a defect in this region of interest in the first inspection image of the first assembly unit based on visual inspection of this annotated inspection image; alternatively, the user can reference the annotated inspection image to guide dismantling, testing, or other physical inspection of the first assembly unit to confirm whether features in these isolated dimensions exhibit strong correlation to the particular defect. The system can then update or modify a correlation between this small set of dimensions and the particular defect based on this feedback in order to construct a model predictive of the particular defect in Block S162.

Furthermore, pending confirmation from the user that this region of interest in the first assembly unit exhibited the particular defect or may otherwise contribute to the particular defect, the system can prompt selective inspection of additional assembly units in and around the first and second clusters in order to further refine features and/or dimensions predictive of the particular defect. In the foregoing example, the system can: identify a first feature (e.g., a value or value range in a first dimension) and a second feature (e.g., a value or value range in a second dimension) common to vectors in the first cluster and excluded from vectors in the second cluster. The system can then: identify a third vector that represents a third assembly unit, contains the first feature, and excludes the second feature; generate a prompt to inspect the third assembly unit for the particular defect; and then disassociate the first feature from the defect if the user thus confirms absence of the particular defect from the third assembly unit. The system can therefore select key assembly units characterized by certain combinations of features, issue prompts to selectively label or provide feedback for these assembly units, and then construct a robust model for the particular defect (or for a set of known defects) based on this minimum targeted input from one or more users.

The system can then leverage this model and inspection images of past and/or future assembly units to identify assembly units highly likely to exhibit the particular defect and then serve intelligent prompts to inspect (or cull, or rework) these assembly units accordingly. For example, the system can: receive a new inspection image of a new assembly unit recorded by the optical inspection station; detecting a new set of features in the new inspection image; and then serve a prompt to inspect the new assembly unit for the particular defect—such as to the optical inspection station or to a local computing device near the optical inspection station—in (near) real-time in response to the new set of features approximating the model set of features thus associated with the particular defect.

The system can implement similar methods and techniques to associate differences between two or more distinct clusters of vectors in the feature space with various positive and negative outcomes and to construct models of representative feature sets accordingly.

11.1 Example: Antenna Malfunction Model

In one example, a batch of assembly units are assembled; during testing, a first set of assembly units in this batch are determined to exhibit antenna malfunction, and a second set of assembly units in this batch are determined to exhibit proper antenna function. In this example, the system: generates vectors from inspection images of these assembly units in Blocks S120, S122, and S124; retrieves antenna test data for these assembly units; tags each vector with the antenna function of its corresponding assembly unit in Block S140; and implements structured data analysis techniques to group these vectors into two (or more) clusters in Block S130. The system then: identifies a first cluster of vectors representing all or some assembly units in the first set; identifies a second cluster of vectors representing all or some assembly units in the second set; identifies a first set of feature ranges containing vectors in the first cluster but disjointed from (i.e., not containing) vectors in the second cluster; and associates the first set of feature ranges with antenna malfunction. For example, the system can implement a support vector machine to define the first set of feature ranges that includes: features (e.g., a fastener, fillet, trace, circuit component) missing entirely from either the first or second cluster; a range of component spacings; a range of relative component orientations; and/or a range of feature geometries (e.g., shape, length, profile, surface finish, etc.); etc.

A combination of all or a subset of feature ranges in the first set may therefore be indicative or predictive of antenna failure in assembly units of this type at this production stage. In particular, the system can link a specific subset of feature ranges—filtered from a large number (e.g., "n") of features extracted from inspection images of defective and sound assembly units—to a particular defect. The system can then predict a similar defect in a second assembly unit responsive to the first set of feature ranges containing a vector representing this second assembly unit.

Similarly, in the foregoing example, the system can: identify a second set of feature ranges containing vectors in the second cluster but disjointed from (i.e., not containing) vectors in the first cluster; and associate the second set of feature ranges with proper antenna function. The system can thus link a specific subset of features—from a large number of features extracted from inspection images of defective and sound assembly units—to a proper aesthetic condition or proper function of an assembly unit of this type at this production stage. The system can then predict proper aesthetic condition or function in a second assembly unit responsive to the second set of feature ranges containing a vector representing this second assembly unit. Alternatively, if the second set of feature ranges fails to contain some or much of the second vector, the system can predict similar failure of this second assembly unit but also prompt an engineer to inspect select regions of this second assembly unit in which these features of the second assembly unit fall outside of the second set of feature ranges.

In this variation, by defining the first set of feature ranges, the system can filter a total number of features representing an assembly unit down to a much smaller number of features likely to indicate a functional or aesthetic defect; reducing this number of features down to a number digestible by an human enables the system to collect feedback from a user, such as in the form of an hypothesis regarding which feature ranges in this set contributed to failure and/or in the form of labels for these feature ranges (e.g., "part missing," "broken trace," "misoriented electrical component," etc.).

In one implementation, the system: selects a first inspection image corresponding to a vector representative of the first cluster; highlights features in the first inspection image corresponding to the first set of feature ranges; serves the first inspection image to a user through an instance of the user portal; and prompts the user to manually select and label these highlighted features. In the foregoing example, the system can: prompt the user to manually select highlighted features she predicts as the root cause of antenna failure in the corresponding assembly unit.

Specifically, in the foregoing example, by identifying the first set of feature ranges common to assembly units exhibiting antenna malfunction but not characteristic of assembly units exhibiting proper antenna function, the system can filter a large number (e.g., thousands, or "n") of features down to a significantly smaller number of features exhibiting greater likelihood of representing a defect mode for antennas in this assembly. By prompting the user to review this much smaller set of features or to review inspection images containing a spectrum of ranges of these features, the system can enable the user to relatively quickly identify or predict a root cause of antenna malfunction in the first set of assembly units and to label these features and/or inspection images accordingly. The system can then automatically identify other assembly units in the same batch or in other batches that may exhibit a similar antenna defect mode—with a high degree of accuracy and before antennae in these assembly units are tested electronically—by identifying vectors corresponding to these assembly units and exhibiting features within the first set of feature ranges described above.

11.2 User Portal+UX

In this variation, the system can also: select one or a subset of vectors representative of each of a set of discrete clusters; retrieve one inspection image corresponding to each of these vectors; serve these inspection images to the user for review in parallel or in series though the user portal; prompt the user to label specific features in these inspection images that the user judges, expects, or hypothesizes to contribute to success and failure of an aspect of these units; and build and refine a classifier for features based on these user-supplied labels.

In the foregoing example, the system can: retrieve inspection images corresponding to vectors representative of clusters labeled with antenna failure, adequate antenna function, superior antenna function, and/or other antenna-related outcomes; align these inspection images by common feature (e.g., PCB corners, housing edges, etc.), such as described in U.S. patent application Ser. No. 15/407,158; and serve these inspection images to a user through the user portal. The user can then: scroll through these inspection images within the user portal to discern visual differences between assembly units represented by these inspection images; select a region in one or a set of these inspection images that the user judges, expects, or hypothesizes to have contributed to antenna failure and/or success across these assembly units, such as by drawing a virtual box around this region of an inspection image or by dropping a pointer (e.g., a flag) over this region of the inspection image; and then enter a manual label linking this region or pointer to antenna functionality. In this implementation, the system can then associate features contained within this selected region or features intersecting the user-defined pointer with known antenna function outcomes of completed assembly units of this assembly type. Therefore, the system can: assemble a group of inspection images associated with vectors representative of different clusters labeled with different outcomes of a particular function or aesthetic (e.g., antenna function, button function, camera function, battery life, aesthetic surface quality, etc.); serve these inspection images in series or in parallel to the user; and receive—from the user—manual indications of regions within these inspection images that correspond to these functional or aesthetic outcomes (e.g., whether the antenna functions, whether the button functions, whether the camera functions, whether the assembly unit exhibits proper battery life, whether a fastener is present, whether relative positions of two features fall inside or outside of an acceptable bound, etc.). The system can then train a classifier to associate these functional or aesthetic labels with absolute (e.g., binary) or relative (e.g., spectrum) features extracted from these regions or extracted near these pointers—defined by the user—across this set of inspection images.

In another implementation, the system can: assemble a group of inspection images associated with vectors representative of different clusters; and then highlight regions in each of these inspection images containing features correlated with (e.g., representing) differences between these vectors. For example, the system can insert colored boxes over these regions of these inspection images and locate these boxed by common visual features (e.g., an edge, two corners) shared across these inspection images. Alternatively, the system can crop these inspection images to these regions or automatically zoom into these regions as the user scrolls through these inspection images within the user portal. The system can thus align these inspection images and serve these inspection images to the user through the user portal, as described above. As the user views these inspection images (e.g., in series) within the user portal, the user can manually label regions in select inspection images with certain functional or aesthetic outcomes, such as "antenna failure," "adequate antenna function," "superior antenna function," "missing fastener," "fastener intact," "proper component alignment," "components rotated beyond acceptable tolerance," or "components offset beyond acceptable tolerance," etc. The system can then train the classifier to associate these functional or aesthetic outcomes with absolute or relative features extracted from these regions—defined by the user—across this set of inspection images.

In the foregoing implementations, the system can also implement the classifier to automatically define regions of inspection images predicted to correlate to certain known outcomes (e.g., a binary outcome such as presence of a fastener, or a spectrum outcome such as degree of offset between two components that affect a particular function) and write predicted outcome labels to these regions of these inspection images. The system can then serve these inspection images—with these regions highlighted or cropped—to the user for confirmation of these predicted outcome labels; the system can then update or refine the classifier accordingly.

In another implementation, the system can assemble a group of inspection images exhibiting features spanning a range (i.e., a "spectrum") of feature values. For example, the system can aggregate a group of inspection images corresponding to vectors spanning two clusters in one or a subset of feature dimensions. The system can then: highlight or crop regions of these inspection images containing features corresponding to this subset of feature dimensions; align these regions of these inspection images by common features, as described above; and serve these aligned image regions to the user in series through the user portal, such as in order of feature value (e.g., length). While scrolling through these image regions in order within the user portal, the user can label or demarcate: a sequence of these image regions in which represented areas on assembly units are within prescribed tolerances; another sequence of these image regions in which represented areas on assembly units are not within prescribed tolerances; and/or a sequence of these image regions in which represented areas on assembly units are near prescribed tolerances but require further testing or inspection to confirm functionality. Based on labels thus supplied by the user, the system can distinguish clusters of vectors representing assembly units within prescribed tolerances from clusters of vectors representing assembly units outside of prescribed tolerances. The system can then predict success of this function in future assembly units based on proximity of their representative vectors to the clusters.

11.3 Supervised Machine Learning

In the foregoing implementations, the system can assist a user in providing supervision by selecting and packaging image data of representative assembly units; the system can then implement supervised machine learning techniques to develop a classifier (e.g., a model) for correlating features extracted from inspection images of assembly units with certain functional and/or aesthetic outcomes over time.

The system can also update (or "train") the feature classifier described above to place greater weight or priority on detection and extraction of features represented in the first set of feature ranges in order to increase sensitivity of the system to detecting a defect represented by this first set of feature ranges.

Furthermore, the system can implement similar methods and techniques to link other discrete clusters of vectors—associated with a particular defect—with other defect modes for this defect and to define sets of feature ranges for these other defect modes.

As the user (or multiple users) enters feedback and label soundness and defects of assembly units and/or as test data is generated, the system can repeat the foregoing methods and techniques to recalculate clusters of vectors, to identify trends in soundness and defects of assembly units represented by these vectors, and to refine soundness and defect labels assigned to these clusters accordingly in order to improve real-time prediction of known defects in new assembly units and to improve asynchronous detection of newly-identified defects in existing assembly units based on inspection images of these assembly units.

11.4 Features Predictive of Defect Absence

In a similar variation, the system can: label a first cluster, in the set of clusters, with a defect indicated in inspection results of a first subset of assembly units, in the set of assembly units, associated with vectors in the first cluster, the defect corresponding to a particular function of the particular assembly type; label a second cluster, in the set of clusters, with absence of the defect based on inspection results of a second subset of assembly units, in the set of assembly units, associated with vectors in the second cluster; identify a model set of features common to vectors in the second cluster and excluded from vectors in the first cluster; and associate the model set of features with proper operation of the particular function for the particular assembly type.

In particular, in this variation, the system can implement methods and techniques similar to those described above to coverage on feature values (or feature ranges) in a small number of dimensions—in the feature space—that exhibit strong correlation to absence of one or more known defects in an assembly unit.

12. Yield Protection: Drift Detection

In one variation shown in FIG. 6, the system tracks trends in vector position over multiple dimensions in order to predict changes in yield during production of assembly units in Block S170. In particular, by generating multi-dimensional vectors representing multiple features of assembly units produced over time and extrapolating trends in these vectors relative to past vectors representing assembly units of known outcomes, the system can identify drift of certain features (e.g., dimension, tolerance, geometry, etc.) in assembly units at the production stage over time. If left unaddressed, such drift may eventually lead to defective assembly units and decreased yield on the assembly line. Therefore, as the system detects such drift at higher levels of confidence over time, the system can issue prompts to inspect key segments of the assembly for sources of this drift well before this drift results in decreased yield.

12.1 Drift Toward Known Defect

In one implementation, the system: generates a first set of vectors from a first sequence of inspection images of a first set of assembly units assembled over a first period of time in Block S124; groups this first set of vectors into a set of clusters in Block S130; and labels a first cluster in this set with a particular defect based on a known outcome of a first assembly unit represented by a first vector contained in the first cluster in Block S140, as described above. The system can then: access a second sequence of timestamped inspection images of a second set of assembly units of the same assembly type and produced over a second period of time (e.g., the last hour, day, week, or month succeeding the first period of time); generate a second set of timestamped vectors from this second sequence of inspection images; and calculate strength of a trend of this second set of vectors toward the first cluster—associated with the particular defect—over this second period of time in Block S170. If the system thus identifies a trend toward the first cluster over time—such as a strong trend of these recent vectors toward the first cluster rather than a random distribution of distances between recent vectors and the first cluster over the second period of time—the system can predict manufacturing drift on the assembly line leading up to the optical inspection station that recorded these inspection images and prompt a user (e.g., a manufacturing engineer, an assembly line technician, etc.,) to inspect a segment of the assembly line preceding this optical inspection station for a root cause of the drift. The system can thus notify a user of manufacturing drift along the assembly line toward features characteristic of a particular known defect well before an increase in the frequency of assembly units exhibiting this particular defect occurs.

In one example, the system can implement the foregoing method and techniques to generate a vector for each subsequent inspection image of a new assembly unit received from an optical inspection station during a production run. The system can then implement a k-nearest neighbor classifier to locate the new vector in one of: a first cluster associated with realization of a defect; and a second cluster associated with avoidance of the defect. The system can then: calculate a temporal multi-dimensional trendline that represents locations of these new vectors in the feature space; determine whether the trendline is directed toward the first cluster (toward another cluster associated with another defect, and/or away from the second cluster); and extract a rate of drift toward the first cluster (toward another cluster associated with another defect, and/or away from the second cluster) from the trendline. If this trendline is directed toward the first cluster (or otherwise away from the second cluster), if the rate of drift exceeds a threshold rate (e.g., a threshold drift distance per assembly unit), and/or if the trendline has reached a threshold distance from a boundary (or from the centroid) of the first cluster in the feature space, the system can flag the assembly line for inspection, such as a segment of the assembly line just preceding the optical inspection station that recorded these inspection images.

Based on this flag, an engineer or operator may then inspect the assembly line or production processes for a change that yielded this drift toward features correlated with this defect. The system can thus alert and/or assist the engineer or operator in discovering and correcting production issues before these issues affect yield at the assembly line. Over time, the system can repeat this process for each new inspection image that represents a new assembly unit of this same assembly type at the same production stage and imaged in the same orientation. For example, the system can: derive clusters representing positive and negative outcomes in hundreds, thousands, or millions of assembly units completed on the assembly line; detect drift in features (or feature values) present in tens or hundreds of new assembly units produced on the assembly line; and notify a user at or affiliated with the assembly line of such drift detected over this relatively small sequence of recent assembly units.

Therefore, the system can: calculate a rate of drift of a second set of vectors—representing a recent sequence of assembly units—from a second cluster associated with a positive outcome (e.g., lack of any defect or lack of a particular defect) and/or toward a first cluster associated with a negative outcome (e.g., presence of one or more defects) over a period of time; and then generate a notification or prompt to inspect the assembly line in response to this rate of drift exceeding a present threshold. The system can also calculate an urgency for inspection of the assembly line: based on (e.g., proportional to) the rate of drift of these vectors outwardly from the second cluster and/or toward the first cluster; based on (e.g., inversely proportional to) a proximity of vectors representing recent assembly units to a border of the first cluster; and/or based on (e.g., inversely proportional to) residuals of the variance between these recent vectors and the trendline; etc. The system can then incorporate a quantitative or qualitative indicator of this urgency in the prompt in order to indicate to the user how quickly the assembly line may require addressing before a decrease in yield occurs.

(In an example similar to the example above, for a particular defect mode (e.g., a functional or aesthetic requirement, etc.) defined for an assembly in a particular production stage, the system can define and store a set of feature ranges correlated with avoidance of this defect mode, as described above. (The system can additionally or alternatively define and store a range or a set of feature ranges correlated with realization of this defect mode, as described above.) In this example, as an inspection image of each subsequent assembly unit in this same production stage is received over time, the system can: extract these (and other) features from the inspection image; generate a new vector based on these features; locate the new vector relative to past vectors; and calculate a trend in the location of the new and past vectors over time over multiple (e.g., "n-number" of) dimensions. In particular, the system can process the presence and dimensions of these features over a sequence of inspection images—corresponding to a sequence of assembly units—to determine whether any of these features is trending toward a boundary of an acceptable range correlated with avoidance of this defect mode. (Similarly, the system can determine whether any of these features is trending toward a range correlated with realization of this defect mode.) If so, the system can flag the assembly line or flag production processes related to this functional or aesthetic requirement.)

12.2 Drift Correction Confirmation

In this variation, the system can also confirm that a change along the assembly line (or upstream of the assembly line)—following issuance of a notification of drift in Block S170—has resulted in correction or reduction of this detected drift. In particular, by repeating the foregoing methods and techniques, the system can detect: inversion of a previous trend such that vectors representing new assembly units trend back toward a cluster associated with a positive outcome; a reduction in the rate of the previous trend toward a cluster associated with a negative outcome; or elimination of the previous trend and a return to random distribution of (most) vectors representing new assembly units in and around a cluster associated with a positive outcome.

For example, the system can generate the prompt to inspect production preceding the optical inspection station along the assembly line in response to detecting a strong trend of a second set of vectors—representing a second sequence of assembly units—toward a first cluster associated with a negative outcome over a period of time in Block S170, as described above. Later, the system can: access a third sequence of inspection images of a subsequent set of assembly units recorded by the optical inspection station over a next period of time; detect features in each new inspection image and transform these features into vectors representing the subsequent set of assembly units; and confirm correction of a segment of the assembly preceding the optical inspection station in response to detecting a weak trend of this third set of vectors toward the first cluster over this period of time.

When such trend correction is thus detected, the system can clear a prompt or notification to correct the assembly line. However, the system can implement any other method or technique to confirm and respond to such correction of the assembly line.

12.4 Drift Away Known Defect Absence

In a similar variation, the system can implement similar methods and techniques to detect and respond to a trend amongst vectors—representing recent assembly units—away from a cluster associated with a positive outcome (i.e., rather than necessarily toward a cluster associated with a negative outcome).

In one implementation, the system: calculates a centroid of a cluster associated with a positive outcome (e.g., no defects detected or no terminal defects detected); calculates distances between vectors representing new assembly units and this centroid in the feature space; and then calculates a rate of change of this distance across this sequence of vectors of time. If this rate of change is positive, if this rate of change exceeds a threshold rate, and/or if an average of these distances over a recent sequence of vectors exceeds a threshold distance, the system can determine that production on the assembly line is trending generally away from assembly units with positive outcomes—even if yield at the assembly line has not changed—and then generate a prompt to inspect the assembly line accordingly in Block S170.

13. Design Tools

In another variation, the system guides a user in identifying: relative dimensions (e.g., "geometric dimensions") and/or dimensional variations (i.e., "tolerances") of features that yield sound units; and other relative dimensions and/or dimensional variations of features that yield defective assembly units. Generally, the system can leverage labeled vectors, clusters of similar vectors, and feature sets representative of these clusters, as described above, to associate real dimensions and tolerances of real features of an assembly type that avoid known defects. In particular, by representing assembly units as multi-dimensional vectors containing relatively large numbers of unique features and generally without bias or understanding of the context of these features, the system can rapidly extract deeper, higher-order insights into which features predict defects and ranges of these features that still yield sound assembly units. The system can then automatically—or with the assistance of the user—transform these feature ranges into dimension and tolerance suggestions for the assembly in order to reduce production costs and/or increase yield.

In one implementation, the system characterizes a set of feature ranges that contain a cluster of vectors labeled as sound (i.e., meeting all aesthetic and functional requirements), such as by implementing methods and techniques described above. For example, the system can isolate regions of inspection images representing the set of feature ranges, align these regions of these inspection images by a common feature, present these image regions in series through the user portal, and permit the user to scroll through these image regions in sequence, thereby visually indicating to the user ranges of dimensions, profiles, and orientations, etc. of features that still yield sound assembly units. The system can further transform these feature ranges into the real nominal distances, angles, profiles, and tolerances for individual features and groups (or "stacks") of features in assemblies of this type. Alternately, the system can enable the user to select a feature for measurement extraction (e.g., a distance or angle between two corners or edges), and the system can extract a range of dimensions (or a nominal dimension and tolerance) from the image regions, such as described in U.S. patent application Ser. No. 15/407,158. The user (e.g., an engineer) may then adjust a nominal dimension and/or tolerance on a predefined dimension of this feature for this assembly type accordingly. For example, if the system determines—from a cluster of vectors of sound assembly units—that location of two components (represented by multiple features) in the assembly type to within one millimeter of a nominal distance and to within 5° of a nominal angle still yields a sound product, whereas these dimensions were originally assigned tolerances of 0.1 millimeter and 1°, respectively, the system can guide the user in loosening these tolerances on relative (e.g., geometric) location of these two components, which may reduce product costs for this assembly type without significantly reducing yield. Conversely, if the system determines—from a cluster of vectors of sound assembly units—that location of two components (represented by multiple features) in the assembly type by more than 0.1 millimeter beyond a nominal distance and by more than 1° from a nominal angle yields a defective product, whereas these dimensions were originally assigned tolerances of 0.2 millimeter and 2°, respectively, the system can guide the user in tightening these tolerances on relative location of these two components in order to increase yield. The system can implement similar methods and techniques to guide the user in adjusting a nominal dimension specified for the type of assembly.

Similarly, the system can assist the user (or a machine) in refining geometry dimensioning of the type of assembly. For example, a set of feature ranges—identified by the system predictive of a sound assembly unit—can define acceptable ranges of second-order features, such as including a relative distance, angle, or profile between two discrete features. The system can indicate importance of the relative distance, angle, or profile, etc. between these two features in achieving a sound assembly unit; and the user can define a datum and set a dimension from this datum to another feature for the assembly accordingly, such as to improve yield.

In the variation above in which the system develops a model set of features predictive of presence or absence of a defect), the system can: detect a second range of a particular feature—in the model set of features—represented in a second cluster of vectors associated with a positive outcome and that is distinct from a first range of the corresponding feature represented in a first cluster of vectors associated with negative outcomes; and associate the second range of the particular feature in the model set of features with a positive outcome (e.g., sufficient operation of a particular function that is defective in assembly units represented in the first cluster). The system can then: identify a subset of existing vectors in the second cluster that are representative of this range of the particular feature; locate the particular feature in a subset of inspection images of assembly units corresponding to this subset of vectors; transform differences in locations of the particular feature across this subset of inspection images into a dimension; and then store this dimension as a manufacturing tolerance in this region of the assembly units of this type. Alternatively, the system can serve this subset of inspection images to a user via the user portal, such as in sequence or in a composite image, and the user can manually extract a dimension range (e.g., a "tolerance") for a particular feature from these inspection images. The user can then update engineering drawings or an assembly specification, etc. to reflect this dimension range, such as by tightening or loosening an assembly specification to reflect this dimension range thus correlated with positive outcomes for assembly units produced on the assembly line.

Therefore, the system can guide a user in adjusting dimension and tolerance specifications of the assembly in order to increase yield and/or decrease production cost based on features extracted from inspection images of past assembly units and related test data for these assembly units during production, such as after a first batch of 30 assembly units are produced or even after 30M assembly units are produced.

The system can implement similar methods and techniques to guide a user in understanding the affects of dimensions and tolerances assigned to individual features and groups of features on incidence of defects. For example, when designing a new assembly in which a particular defect is conceivable, an engineer may interface with the system to aggregate sets of feature ranges that predict this particular defect in a previous assembly in order to ascertain dimensions, tolerances and datums likely to avoid this particular defect in production of the new assembly. Therefore, the system can implement these methods and techniques to provide both production management tools and new design tools for engineers, assembly line operators, assembly workers, etc.

14. Sub-Clustering

In one variation, the system can implement the foregoing methods and techniques to identify and label sub-clusters of vectors within one cluster of vectors (and to identify and label sub-sub-clusters of vectors within one sub-cluster of vectors, etc.). For example, high-level clusters may be dominated by large differences between assembly units (e.g., presence or lack of a large component within assembly units), though relevant variations may also exist within assembly units represented by vectors within a cluster, and these variations may indicate success of failure of certain functional and/or aesthetic aspects of these assembly units. Therefore, the system can: implement methods and techniques described above to distinguish two or more first-level clusters—among a set of vectors generated from inspection images of assembly units passing through an optical inspection station over time—containing vectors exhibiting large-scale differences; select a particular cluster in this set of first-level clusters; and then repeat the foregoing methods and techniques to distinguish two or more second-level clusters—within the particular cluster—containing vectors exhibiting smaller-scale differences. The system can then detect or predict failures, explore relationships between failures and nominal dimensions and tolerances on these dimensions, and/or detect anomalies across assembly units represented by vectors contained in these second-level clusters, etc., as described above.

15. Simultaneous Assembly Line Tracking Modes

The system can also implement some or all of the foregoing variations of the method S100 simultaneously to detect defects in past assembly units, to detect defects in a new unit, to characterize features predictive of positive and/or negative outcomes, and/or detect drift in features of assembly units produced on the assembly line over longer time scales and to selectively inform or assist various users of the defects, features, and/or trends. For example, the system can simultaneously execute real-time yield protection, real-time anomaly detection, defect propagation, and trend detection techniques described herein.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for predicting manufacturing defects, the method comprising:
    accessing a set of inspection images of a set of assembly units, of a particular assembly type, recorded by an optical inspection station during production of the set of assembly units;
    for each inspection image in the set of inspection images:
        detecting a set of features in the inspection image; and
        generating a vector, in a set of vectors, representing the set of features in a multi-dimensional feature space;
    grouping neighboring vectors, in the set of vectors, in the multi-dimensional feature space into a set of vector groups; and
    in response to receipt of a first inspection result indicating a defect in a first assembly unit, in the set of assembly units, associated with a first vector in a first vector group, in the set of vector groups:
        labeling the first vector group with the defect;
        calculating probabilities of the defect in assembly units in the set of assembly units based on proximity of corresponding vectors to the first vector in the multi-dimensional feature space;
        flagging a second assembly unit associated with a second vector, in the first vector group, as exhibiting characteristics of the defect; and
        generating a prompt to inspect the second assembly unit in response to a probability of the defect in the second assembly unit exceeding probabilities of the defect in the other assembly units in the set of assembly units.

2. The method of claim 1, wherein detecting sets of features in the set of inspection images comprises, for each inspection image in the set of inspection images:

dividing the inspection image into a set of image segments;
selecting a subset of image segments, in the set of image segments, corresponding to an assembly unit region of interest associated with the optical inspection station, in a set of optical inspection stations arranged along an assembly line;
for each image segment in the subset of image segments, extracting a subset of features from the image segment; and
compiling subsets of features extracted from the subset of image segments into the set of features in the inspection image.

3. The method of claim 2:
wherein accessing the set of inspection images comprises accessing the set of inspection images from a database, the set of inspection images recorded over a first period of time by the optical inspection station;
further comprising:
receiving a second inspection image of the second assembly unit recorded by the optical inspection station at a second time succeeding the first period of time;
dividing the second inspection image into a second set of image segments;
selecting a second subset of image segments, in the second set of image segments, corresponding to the assembly unit region of interest associated with the optical inspection station;
extracting a subset of features from each image segment in the second set of image segments;
compiling subsets of features extracted from the second subset of image segments into a second set of features in the second inspection image; and
generating the second vector representing the second set of features in the multi-dimensional feature space; and
wherein flagging the second assembly unit comprises serving a prompt, to inspect the second assembly unit for the defect, to a user portal at approximately the second time in response to associating the second vector with the first vector group based on proximity of the second vector to the first vector in the multi-dimensional feature space.

4. The method of claim 3, wherein serving the prompt to inspect the second assembly unit to the user portal comprises serving the prompt to the user portal executing on a mobile computing device associated with an operator and located proximal the assembly line at the second time.

5. A method for predicting manufacturing defects, the method comprising:
accessing a set of inspection images of a set of assembly units, of a particular assembly type, recorded by an optical inspection station during production of the set of assembly units;
for each inspection image in the set of inspection images:
detecting a set of features in the inspection image, wherein detecting sets of features in the set of inspection images comprises, for each inspection image in the set of inspection images:
projecting the region of interest from the first inspection image onto the inspection image; and
extracting the set of features from the region of interest in the inspection image; and
generating a vector, in a set of vectors, representing the set of features in a multi-dimensional feature space; and grouping neighboring vectors, in the set of vectors, in the multi-dimensional feature space into a set of vector groups, wherein grouping vectors into vector groups comprises grouping vectors, in the set of vectors, into the first vector group based on proximity to the first vector in the multi-dimensional feature space;
in response to receipt of a first inspection result indicating a defect in a first assembly unit, in the set of assembly units, associated with a first vector in a first vector group, in the set of vector groups:
labeling the first vector group with the defect, wherein labeling the first vector group with the defect comprises predicting presence of the defect in a subset of assembly units, in the set of assembly units, associated with vectors in the first vector group; and
flagging a second assembly unit associated with a second vector, in the first vector group, as exhibiting characteristics of the defect; and
serving a first inspection image of the first assembly unit to a user portal; and
receiving manual selection of a region of interest in the first inspection image via the user portal, the region of interest in the first inspection image predicted by a user to depict a source of the defect.

6. The method of claim 5, further comprising:
receiving the first inspection result comprising indication of the defect in the first assembly unit that was previously vended and returned as defective; and
automatically generating a list of serial numbers of the particular assembly type, the list of serial numbers corresponding to assembly units in the subset of assembly units previously vended.

7. The method of claim 5:
further comprising receiving the first inspection result comprising indication of the defect comprising an aesthetic defect; and
wherein flagging the second assembly unit comprises:
projecting the region of interest from the first inspection image onto a second inspection image of the second assembly unit;
serving the region of interest in the second inspection image to a user through a user portal; and
prompting the user to confirm presence of the aesthetic defect in the region of interest in the second inspection image.

8. A method for predicting manufacturing defects, the method comprising:
accessing a set of inspection images of a set of assembly units, of a particular assembly type, recorded by an optical inspection station during production of the set of assembly units;
for each inspection image in the set of inspection images:
detecting a set of features in the inspection image; and
generating a vector, in a set of vectors, representing the set of features in a multi-dimensional feature space;
grouping neighboring vectors, in the set of vectors, in the multi-dimensional feature space into a set of vector groups, wherein grouping neighboring vectors into the set of vector groups comprises:
defining a manifold delineating a first multi-dimensional volume containing the first vector and the second vector from a second multi-dimensional volume containing a third vector; and
grouping vectors within the first multi-dimensional volume into the first vector group;
in response to receipt of a first inspection result indicating a defect in a first assembly unit, in the set of assembly units, associated with a first vector in a first vector group, in the set of vector groups:
  labeling the first vector group with the defect; and
  flagging a second assembly unit associated with a second vector, in the first vector group, as exhibiting characteristics of the defect, wherein flagging the second assembly unit for the defect comprises generating a prompt to inspect the second assembly unit for the defect;
receiving confirmation of absence of the defect in the second assembly unit responsive to the prompt to inspect the second assembly unit;
in response to confirmation of absence of the defect in the second assembly unit, calculating a revised manifold delineating a first revised multi-dimensional volume containing the first vector and a second revised multi-dimensional volume containing the second vector;
grouping vectors within the first revised multi-dimensional volume into a revised first vector group; and
generating a second prompt to inspect a fourth assembly unit associated with a fourth vector, in the revised first vector group, for the defect.

9. A method for predicting manufacturing defects, the method comprising:
  accessing a set of inspection images of a set of assembly units, of a particular assembly type, recorded by an optical inspection station during production of the set of assembly units;
  for each inspection image in the set of inspection images:
    detecting a set of features in the inspection image; and
    generating a vector, in a set of vectors, representing the set of features in a multi-dimensional feature space;
  grouping neighboring vectors, in the set of vectors, in the multi-dimensional feature space into a set of vector groups;
  labeling a first vector group, in the set of vector groups, with a defect indicated in inspection results of a first subset of assembly units, in the set of assembly units, associated with vectors in the first vector group, the defect corresponding to a particular function of the particular assembly type;
  labeling a second vector group, in the set of vector groups, with absence of the defect based on inspection results of a second subset of assembly units, in the set of assembly units, associated with vectors in the second vector group;
  identifying a model set of features common to vectors in the second vector group and excluded from vectors in the first vector group; and
  associating the model set of features with proper operation of the particular function for the particular assembly type.

10. The method of claim 9:
  wherein identifying the model set of features comprises detecting a range of a particular feature in the model set of features represented in the second vector group and distinct from a range of a corresponding feature represented in the first vector group;
  wherein associating the model set of features with sufficient operation of the particular function comprises associating the range of the particular feature in the model set of features with sufficient operation of the particular function; and
  further comprising:
    identifying a subset of vectors in the second vector group representative of the range of the particular feature;
    locating the particular feature in a subset of inspection images of assembly units corresponding to the subset of vectors;
    transforming differences in locations of the particular feature in the subset of inspection images into a dimension; and
    storing the dimension as a manufacturing tolerance.

11. The method of claim 9:
  wherein accessing the set of inspection images comprises accessing the set of inspection images comprising digital color photographic images recorded by the optical inspection station over a first period of time; and
  further comprising:
    receiving a second inspection image of a second assembly unit recorded by the optical inspection station at a second time succeeding the first period of time;
    detecting a second set of features in the second inspection image; and
    in response to the second set of features differing from the model set of features, serving a prompt to inspect the second assembly unit to a user portal at approximately the second time, the user portal executing on a computing device proximal the optical inspection station.

12. A method for predicting manufacturing defects, the method comprising:
  accessing a set of inspection images of a set of assembly units, of a particular assembly type, recorded by an optical inspection station during production of the set of assembly units;
  for each inspection image in the set of inspection images:
    detecting a set of features in the inspection image; and
    generating a vector, in a set of vectors, representing the set of features in a multi-dimensional feature space;
  grouping neighboring vectors, in the set of vectors, in the multi-dimensional feature space into a set of vector groups;
  labeling a first vector group, in the set of vector groups, with a defect indicated in inspection results of a first subset of assembly units, in the set of assembly units, associated with vectors in the first vector group;
  labeling a second vector group, in the set of vector groups, with absence of the defect based on inspection results of a second subset of assembly units, in the set of assembly units, associated with vectors in the second vector group;
  identifying a model set of feature ranges represented in vectors in the first vector group and distinct from vectors in the second vector group; and
  associating the model set of features with the defect.

13. The method of claim 12, further comprising:
  identifying a third vector, associated with a third assembly unit in the set of assembly units, located between the first vector group and the second vector group in the multi-dimensional feature space;
  serving a prompt to a user portal to inspect the third assembly unit for the defect; and
  in response to receipt of confirmation of the particular define in the third assembly unit:
    updating the first vector group to encompass the third vector;
    identifying a revised set of features common to vectors in the first vector group and excluded from vectors in the second vector group; and
    associating the model set of features with the defect.

14. The method of claim 12:
wherein identifying the model set of features comprises identifying a first feature and a second feature common to vectors in the first vector group and excluded from vectors in the second vector group; and
further comprising:
identifying a third vector representing a third assembly unit, containing the first feature, and excluding the second feature;
generating a prompt to inspect the third assembly unit for the defect; and
in response to confirmation of absence of the defect from the third assembly unit, disassociating the first feature from the defect.

15. The method of claim 12:
further comprising:
serving a first inspection image of a first assembly unit to a user portal; and
receiving manual selection of a region of interest in the first inspection image via the user portal, the region of interest in the first inspection image predicted by a user to depict a source of the defect in the first assembly unit;
wherein detecting sets of features in the set of inspection images comprises, for each inspection image in the set of inspection images:
projecting the region of interest from the first inspection image onto the inspection image; and
extracting the set of features from the region of interest in the inspection image;
wherein grouping vectors into vector groups comprises grouping vectors, in the set of vectors, into the first vector group based on proximity to the first vector in the multi-dimensional feature space; and
further comprising:
predicting presence of the defect in a third subset of assembly units associated with vectors in the first vector group, the third subset of assembly units contained in the set of assembly units and distinct from the first subset of assembly units; and
generating a prompt to inspect the third set of assembly units for the defect.

16. The method of claim 12, further comprising:
selecting a first vector representative of the first vector group and associated with a first assembly unit in the set of assembly units;
selecting a second vector representative of the second vector group and associated with a second assembly unit in the set of assembly units;
detecting a common reference feature in the first inspection image and the second inspection image; and
within a user portal executing on a computing device, toggling between rendering the first inspection image and rendering the second inspection image, the first inspection image and the second inspection image virtually aligned by the common reference feature within the user portal.

17. The method of claim 16, wherein toggling between rendering the first inspection image and rendering the second inspection image comprises animating a transition from rendering the first inspection image to rendering the second inspection image, virtually aligned to the first inspection image in rotation and orientation by the common reference feature, within the user portal.

18. The method of claim 12:
wherein labeling the first vector group comprises:
selecting a first vector representative of first vector group;
serving a first prompt to a user, via a user portal, to inspect a first assembly unit, in the set of assembly units, for a defect, the first assembly unit associated with the first vector; and
labeling the first vector group with the defect in response to receipt of the first inspection result indicating the defect in the first assembly unit; and
wherein labeling the second vector group comprises:
selecting a second vector representative of second vector group;
serving a second prompt to the user, via the user portal, to inspect a second assembly unit, in the set of assembly units, for a defect, the second assembly unit associated with the second vector; and
labeling the second vector group with absence of the defect in response to receipt of the second inspection result excluding an indication of the defect in the second assembly unit.

19. The method of claim 12:
wherein accessing the set of inspection images comprises accessing the set of inspection images comprising digital color photographic images recorded by the optical inspection station over a first period of time;
further comprising:
receiving a second inspection image of a second assembly unit recorded by the optical inspection station at a second time succeeding the first period of time;
detecting a second set of features in the second inspection image; and
in response to the second set of features approximating the model set of features, serving a prompt to inspect the second assembly unit to a user portal at approximately the second time, the user portal executing on a computing device proximal the optical inspection station.

* * * * *